United States Patent
Watanabe et al.

(10) Patent No.: US 8,823,207 B2
(45) Date of Patent: Sep. 2, 2014

(54) POWER CONVERSION APPARATUS

(75) Inventors: Kazunori Watanabe, Kariya (JP);
Tsuneo Maebara, Nagoya (JP)

(73) Assignee: Denso Corporation, Kariya (JP)

( * ) Notice: Subject to any disclaimer, the term of this patent is extended or adjusted under 35 U.S.C. 154(b) by 165 days.

(21) Appl. No.: 13/568,433

(22) Filed: Aug. 7, 2012

(65) Prior Publication Data

US 2013/0039097 A1 Feb. 14, 2013

(30) Foreign Application Priority Data

Aug. 9, 2011 (JP) .................................. 2011-174330

(51) Int. Cl.
*H02G 3/00* (2006.01)
*B60L 1/00* (2006.01)

(52) U.S. Cl.
USPC .......................................... 307/9.1; 307/10.1

(58) Field of Classification Search
USPC .................................................. 307/9.1, 10.1
See application file for complete search history.

(56) References Cited

U.S. PATENT DOCUMENTS 8,406,026 B2 * 3/2013 Fukuta et al. ................. 363/144
2011/0058400 A1 3/2011 Fukuta et al.

FOREIGN PATENT DOCUMENTS

| JP | 63-198386 | 12/1988 |
| JP | 2007-274759 | 10/2007 |
| JP | 2011-083179 | 4/2011 |

* cited by examiner

*Primary Examiner* — Hal Kaplan
(74) *Attorney, Agent, or Firm* — Nixon & Vanderhye P.C.

(57) ABSTRACT

A power conversion apparatus capable of suppressing adverse effects of noise caused by crossing of wiring patterns on a wiring board mounting the apparatus thereon. The apparatus includes a transformer, a switching element connected to the transformer, a feedback rectification circuit, and a control circuit operable to control the switching element in response to a DC voltage from the feedback rectification circuit. A first wiring pattern electrically connecting the feedback rectification circuit and the control circuit is formed in one of two surface regions of the wiring board separated by an imaginary line running through a junction of the first wiring pattern and the feedback rectification circuit and a junction of the first wiring pattern and the control circuit, and a second wiring pattern electrically connecting the control circuit and the switching element is formed outside an area enclosed by the imaginary line and the first wiring pattern.

9 Claims, 13 Drawing Sheets

POWER CONVERSION APPARATUS

CROSS-REFERENCE TO RELATED APPLICATION

This application is based on and claims the benefit of priority from earlier Japanese Patent Application No. 2011-174330 filed Aug. 9, 2011, the description of which is incorporated herein by reference.

BACKGROUND

1. Technical Field

This invention relates to a power conversion apparatus.

2. Related Art

A known power conversion apparatus includes a motor-generator control apparatus as disclosed in Japanese Patent Application Laid-Open Publication No. 2011-083179.

The disclosed motor-generator control apparatus includes a power supply circuit that supplies a voltage for driving each of a plurality of insulated gate bipolar transistors (IGBTs) to a drive circuit for the IGBT. The power supply circuit includes a transformer, a switching element (MOSFET: metal-oxide-semiconductor field-effect transistor), a plurality of rectification circuits (diodes), a plurality of capacitors, and a control circuit (an output voltage stabilization circuit). The transformer includes a primary coil and a plurality of secondary coils. One of the plurality of secondary coils (a feedback secondary coil) is used for feedback of an output voltage of the transformer to the control circuit and each of the other secondary coils is used to supply a voltage to a respectively corresponding drive circuit. One of a pair of terminals of the primary coil is electrically connected to the switching element and the other of the pair of terminals of the primary coil is electrically connected to a low-voltage battery. A direct-current (DC) voltage supplied from the low-voltage battery is converted into an alternating-current (AC) voltage by alternately turning on and off the switching element. The AC voltage is supplied to the primary coil. One of the rectification circuits, which is electrically connected to the feedback secondary coil, rectifies an AC voltage outputted from the feedback secondary coil into a DC voltage to feed back the DC voltage to the control circuit. Each of the other rectification circuits associated with the respective secondary coils other than the feedback secondary coil is used to supply a DC voltage to a respectively corresponding drive circuit. The plurality of capacitors are electrically connected to the respective rectification circuits. Each of the plurality of capacitors smooths a DC voltage from a respectively corresponding rectification circuit. The control circuit is electrically connected to the feedback rectification circuit and to the switching element, and controls the switching element in response to the DC voltage rectified by the feedback rectification circuit. That is, the control circuit controls the switching element so that the DC voltage rectified by the feedback rectification circuit is kept at a predetermined voltage. This allows an output voltage of each of the other rectification circuits, that is, each output voltage of the power supply circuit, to be stabilized at a predetermined voltage.

In the disclosed motor-generator control apparatus, however, the transformer, the switching element, the feedback rectification circuit, the capacitor for the feedback rectification circuit, and the control circuit are mounted on a wiring board. A pulse signal for turning on and off or switching the switching element is transmitted through a wiring pattern that connects the control circuit and the switching element. When a wiring pattern that connects the feedback rectification circuit and the control circuit crosses the wiring pattern that connects the control circuit and the switching element, noise associated with the pulse signal will be superimposed on a signal transmitted through the wiring pattern that connects the feedback rectification circuit and the control circuit. This may prevent the switching element from being controlled properly on the basis of the DC voltage rectified by the feedback rectification circuit, which may thus prevent the output voltages of the power supply circuit from being stabilized.

In consideration of the foregoing, exemplary embodiments of the present invention are directed to providing a power conversion apparatus capable of preventing a wiring pattern that connects a feedback rectification circuit and a control circuit and a wiring pattern that connects the control circuit and a switching element controlled by the control circuit from crossing each other, thereby suppressing adverse effects of noise.

SUMMARY

In accordance with an exemplary embodiment of the present invention, there is provided a power conversion apparatus including: a transformer mounted on a wiring board, where the transformer includes a primary coil, a secondary coil, and a feedback secondary coil; a switching element mounted on the wiring board and electrically connected to one of a pair of connection terminals of the primary coil, where the switching element is operable to convert a DC voltage supplied from a voltage source electrically connected to the other of the pair of connection terminals of the primary coil into an AC voltage to supply the AC voltage to the primary coil by being turned on and off; a feedback rectification circuit mounted on the wiring board and electrically connected to the feedback secondary coil, where the rectification circuit is operable to rectify an AC voltage outputted from the feedback secondary coil into a DC voltage; a control circuit mounted on the wiring board and electrically connected to the switching element and to the feedback rectification circuit, where the control circuit is operable to control the switching element in response to the DC voltage outputted from the feedback rectification circuit. The apparatus further includes: a first wiring pattern that electrically connects the feedback rectification circuit and the control circuit, where the first wiring pattern is formed in one of two surface regions of the wiring board separated from each other by an imaginary line running through a first junction of the first wiring pattern and the feedback rectification circuit and a second junction of the first wiring pattern and the control circuit; and a second wiring pattern that electrically connects the control circuit and the switching element, where the second wiring pattern is formed outside an area enclosed by the imaginary line and the first wiring pattern.

A pulse signal for turning on and off the switching element is transmitted through the wiring pattern that electrically connects the control circuit and the switching element. When the wiring pattern that electrically connects the feedback rectification circuit and the control circuit crosses the wiring pattern that electrically connects the control circuit and the switching element, noise associated with the pulse signal will be superimposed on a signal transmitted through the wiring pattern that electrically connects the feedback rectification circuit and the control circuit, which may prevent the switching element from being controlled properly on the basis of the DC voltage rectified by the feedback rectification circuit.

With the above configuration, it is possible to prevent the wiring pattern that electrically connects the feedback rectification circuit and the control circuit and the wiring pattern that electrically connects the control circuit and the switching element from crossing each other, which can suppress adverse effects of noise caused by the pulse signal. Therefore, the switching element can be controlled properly on the basis of the DC voltage rectified by the feedback rectification circuit.

DESCRIPTION OF SPECIFIC EMBODIMENTS

The present invention will be described more fully hereinafter with reference to the accompanying drawings. Exemplary embodiments of the present invention are applied to a motor-generator control apparatus mounted in a vehicle.

(First Embodiment)

Figure 1:
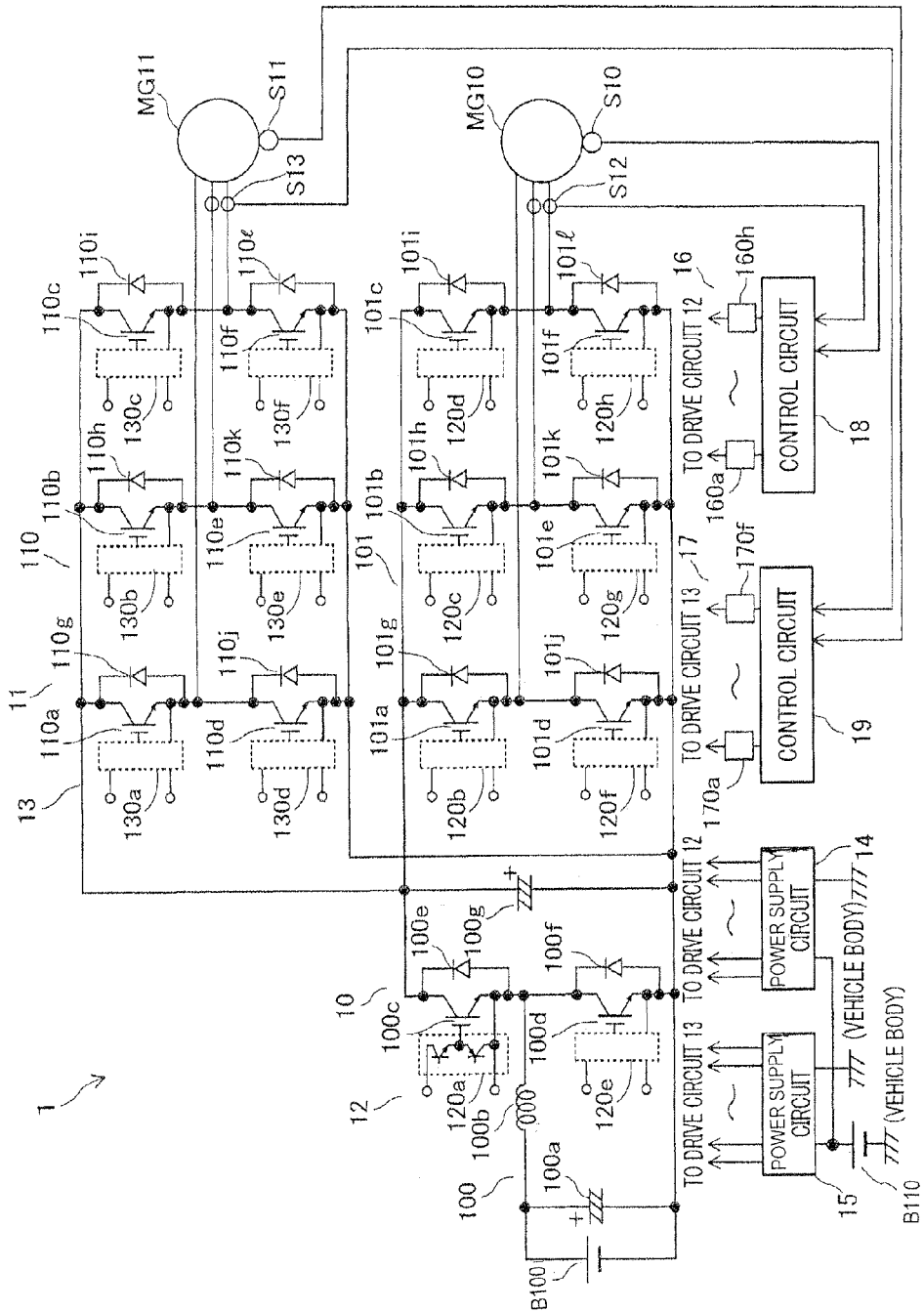
FIG. 1 is a circuit diagram of a motor-generator control apparatus in accordance with a first embodiment of the present invention.
Figure 2:
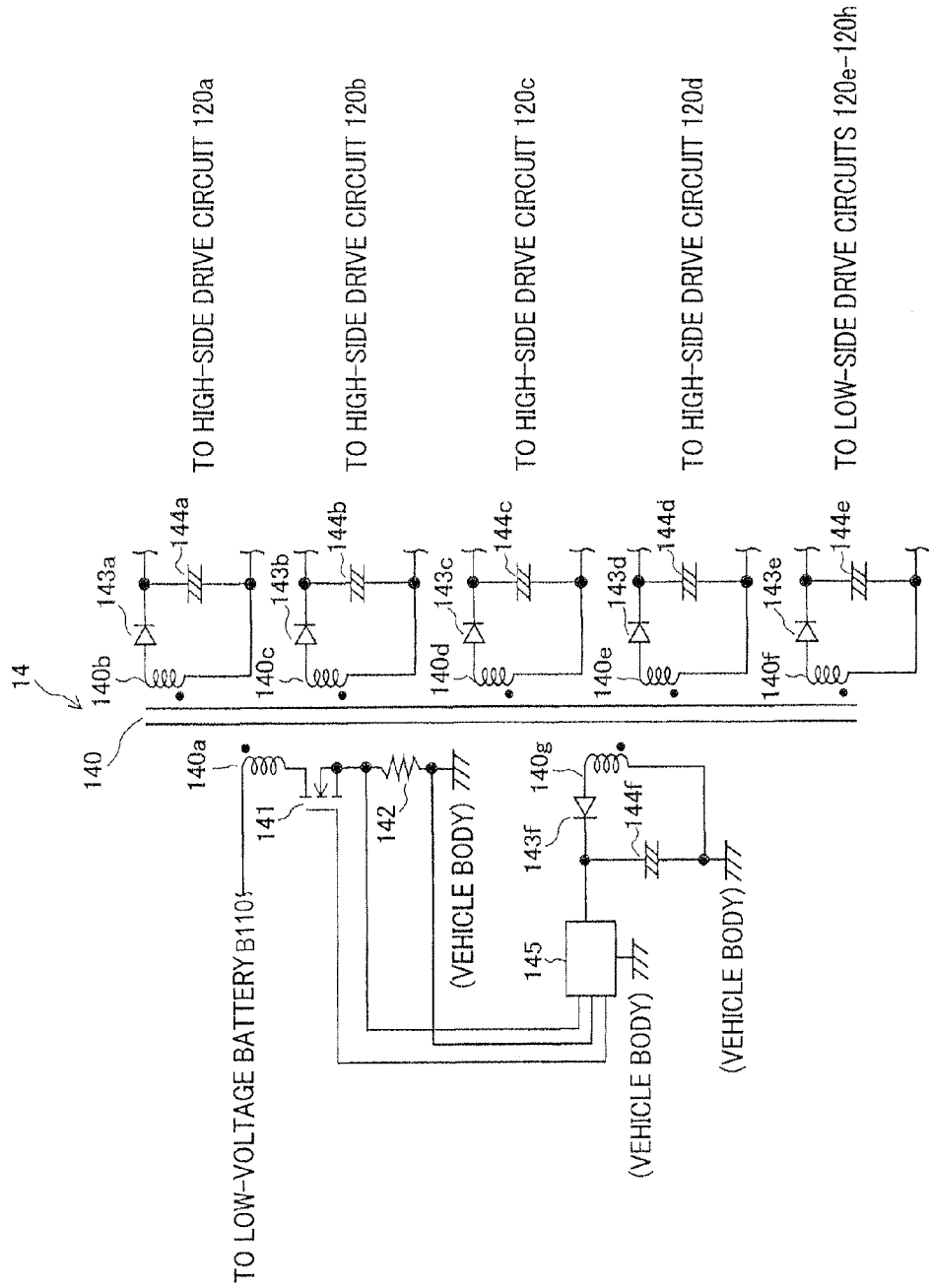
FIG. 2 is a circuit diagram of a first power supply circuit of the motor-generator control apparatus of the first embodiment.
Figure 3:
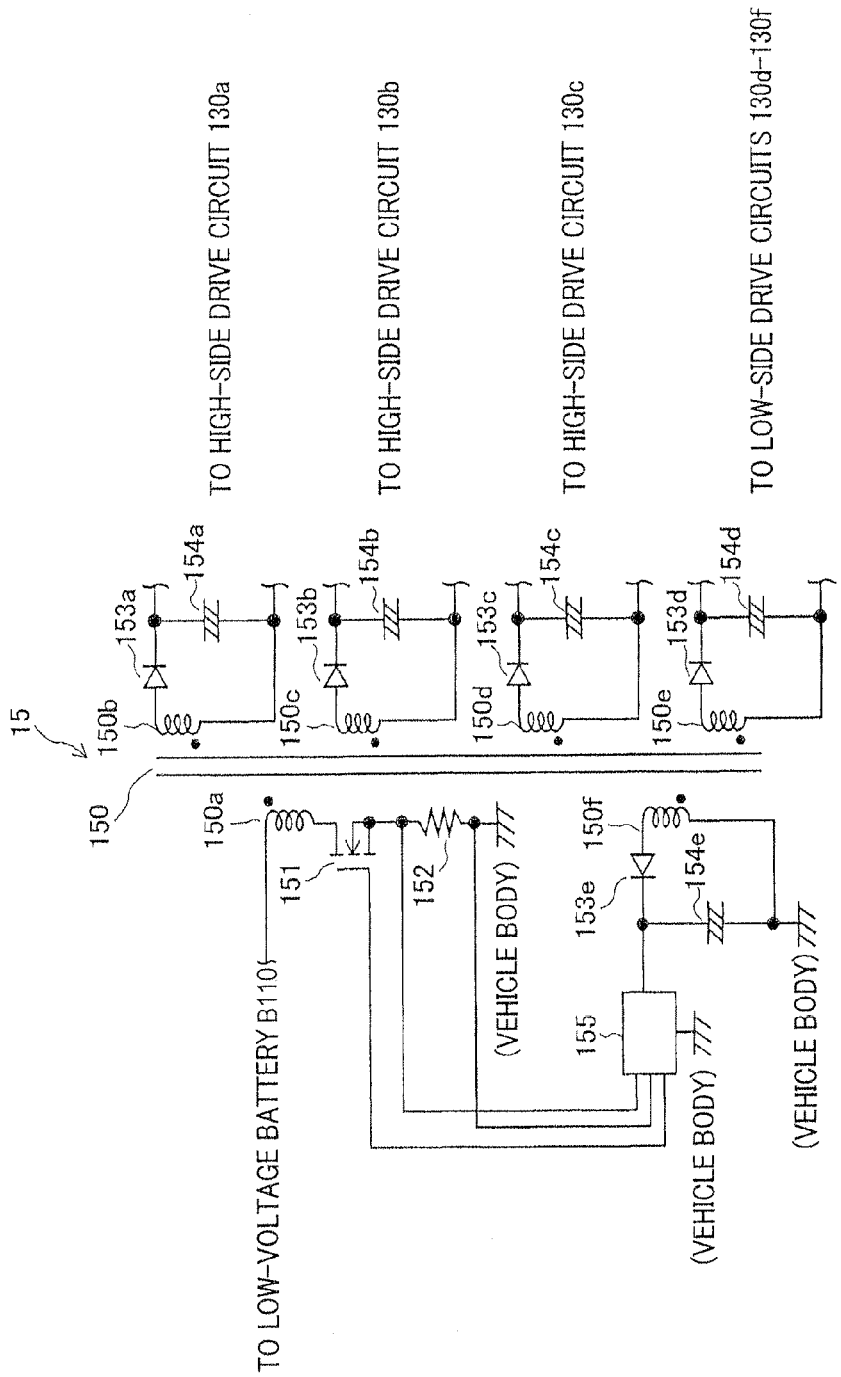
FIG. 3 is a circuit diagram of a second power supply circuit of the motor-generator control apparatus of the first embodiment.

There will now be explained a motor-generator control apparatus in accordance with a first embodiment of the invention with reference to FIGS. 1 to 3. FIG. 1 is a circuit diagram of the motor-generator control apparatus of the first embodiment. FIG. 2 is a circuit diagram of a first power supply circuit (of a pair of power supply circuits) that generates a voltage to drive one of a pair of power conversion circuits of the motor-generator control apparatus. FIG. 3 is a circuit diagram of a second power supply circuit (of the pair of power supply circuits) that generates a voltage to drive the other of the pair of power conversion circuits of the motor-generator control apparatus.

Each of motor-generators MG10 and MG11 shown in FIG. 1 operates as a motor by being supplied with a three-phase AC voltage, and operates as a generator to generate a three-phase AC voltage by being applied with an external driving force. The motor-generators MG10 and MG11 are respectively provided with rotation angle sensors S10 and S11 that detect rotation angles of the respective motor-generators. The motor-generators MG10 and MG11 are further respectively provided with current sensors S12 and S13 that detect phase currents flowing through the respective motor-generators MG10 and MG11.

The motor-generator control apparatus 1 (power conversion apparatus) steps up a DC voltage of a high voltage battery B10, converts the stepped up DC voltage into a three-phase AC voltage, and supplies this three-phase AC voltage to the motor-generators MG10 and MG11 when each of the motor-generators MG10 and MG11 operates as a motor. In addition, the motor-generator control apparatus 1 converts a three-phase AC voltage generated by each of the motor-generators MG10 and MG11 into a DC voltage, steps down the DC voltage, and charges the high-voltage battery B10 with the stepped down DC voltage when each of the motor-generators MG10 and MG11 operates as a generator. That is, the motor-generator control apparatus 1 converts DC power into AC power and vice versa. The motor-generator control apparatus 1 includes power conversion circuits 10 and 11, drive circuits 12 and 13, power supply circuits 14 and 15, signal transmission circuits 16 and 17, and power conversion control circuits 18 and 19.

The power conversion circuit 10 steps up the DC voltage of the high voltage battery B10, converts the stepped up DC voltage into a three-phase AC voltage, and supplies the three-phase AC voltage to the motor generator MG10, when the motor generator MG10 operates as a motor. The power conversion circuit 10 also converts a three-phase AC voltage generated by the motor generator MG10 into a DC voltage, steps down the DC voltage, and charges the high voltage battery B10 with the stepped down DC voltage, when the motor generator MG10 operates as a generator. The power conversion circuit 10 includes a converter circuit 100 and an inverter circuit 101.

The converter circuit 100 steps up the DC voltage of the high voltage battery B10, and supplies the stepped up DC voltage to the inverter circuit 101 and an inverter circuit 110 (which will be described later). The converter circuit 100 further steps down the DC voltage supplied from the inverter circuits 101 and 110, and charges the high voltage battery B10 with the stepped down DC voltage. The converter circuit 100 includes a capacitor 100a, a coil 100b, an IGBT 100c as a high-side switching element, an IGBT 100d as a low-side switching element, diodes 100e and 100f, and a capacitor 100g.

The capacitor 100a is operable to smooth a DC voltage. The capacitor 100a smooths the DC voltage of the high voltage battery B10 during the voltage step-up operation, and smooths the stepped-down DC voltage to charge the high voltage battery B10 during the voltage step-down operation. The positive and negative terminals of the capacitor 100a are electrically connected to the positive and negative terminals of the high voltage battery B10, respectively.

The coil 100b accumulates energy therein and discharges the accumulated energy while inducing a voltage thereacross. A first terminal of the coil 100b is electrically connected to the positive terminal of the capacitor 100a, and a second terminal (different from the first terminal) of the coil 100b is electrically connected to the IGBTs 100c and 100d.

The IGBTs 100c and 100d each operate as a switching element to cause the coil 100b to accumulate energy and discharge the accumulated energy by being turned on and off. The IGBTs 100c and 100d are electrically connected in series to each other. More specifically, the emitter of the IGBT 100c is electrically connected to the collector of the IGBT 100d. A junction of the IGBTs 100c and 100d is electrically connected to the second terminal of the coil 100b. The collector of the IGBT 100c is electrically connected to a positive terminal of the capacitor 100g, and the emitter of the IGBT 100d is electrically connected to the negative terminals of the respective capacitors 100a and 100g. The gate of the IGBT 100c is electrically connected to a high-side drive circuit 120a (which will be described later), and the gate of the IGBT 100d is electrically connected to a low-side drive circuit 120e (which will be described later).

The diodes 100e and 100f are provided for passing a flywheel current generated as a result of the energy accumulated in the coil 100b being discharged when the IGBT 100c or 100d is turned off. The anodes of the diodes 100e and 100f are respectively electrically connected to the emitters of the IGBTs 100c and 100d, and the cathodes of the diodes 100e and 100f are respectively electrically connected to the collectors of the IGBTs 100c and 100d.

The capacitor 100g is operable to smooth a DC voltage. The capacitor 100g smooths the stepped-up DC voltage supplied to the inverters 101 and 110 during the voltage step-up operation and smooths the DC voltage outputted from the inverters 101 and 110 during the voltage step-down operation. The positive terminal of the capacitor 100g is electrically connected to the collector of the IGBT 100c, and the negative terminal of the capacitor 100g is electrically connected to the emitter of the IGBT 100d. The positive and negative terminals of the capacitor 100g are each electrically connected to the inverters 101 and 110.

The inverter circuit 101 converts the DC voltage outputted from the converter circuit 100 into a three-phase AC voltage, and supplies this three-phase AC voltage to the motor generator MG10 when the motor generator MG10 operates as a motor. The inverter circuit 101 also converts a three-phase AC voltage generated by the motor-generator MG10 into a DC voltage, and supplies this DC voltage to the converter circuit 100 when the motor-generator MG10 operates as a generator. The inverter circuit 101 includes IGBTs 101a to 101f and diodes 101g to 101l.

The IGBTs 101a to 101f are each operable to convert a DC voltage into a three-phase AC voltage by being turned on and off. The IGBTs 101a and 101d, the IGBTs 101b and 101e, and the IGBTs 101c and 101f are respectively electrically connected in series with each other. More specifically, the emitters of the IGBTs 101a to 101c are respectively electrically connected to the collectors of the IGBTs 101d to 101f. The three pairs of series connections of IGBTs, that is, the series connection of the IGBTs 101a and 101d, the series connection of the IGBTs 101b and 101e, and the series connection of the IGBTs 101c and 101f are electrically connected in parallel with each other. The collectors of the IGBTs 101a to 101c are electrically connected to the positive terminal of the capacitor 100g, and the emitters of the IGBTs 101d to 101f are electrically connected to the negative terminal of the capacitor 100g. Accordingly, the four pairs of IGBTs, that is, the series connection of the IGBTs 100c and 100d, the series connection of the IGBTs 101a and 101d, the series connection of the IGBTs 101b and 101e, and the series connection of the IGBTs 101c and 101f are electrically connected in parallel with each other. The gates of the IGBTs 101a to 101c are respectively electrically connected to high-side drive circuits 120b to 120d (which will be described later), and the gates of the IGBTs 101d to 101f are respectively electrically connected to low-side drive circuit 120f to 120h (which will be described later). A junction of the IGBTs 101a and 101d, a junction of the IGBTs 101b and 101e, and a junction of the IGBTs 101c and 101f are electrically connected to the motor-generator MG10.

Each of the diodes 101g to 101l passes a flywheel current generated when the corresponding IGBT is turned off and the energy accumulated in a corresponding coil of the motor-generator MG10 is discharged. Each of the diodes 101g to 101l also serves as an element for converting the three-phase AC voltage generated by the motor-generator MG10 into a DC voltage. The anodes of the diodes 101g to 101l are respectively electrically connected to the emitters of the IGBTs 101a to 101f, and the cathodes of the diodes 101g to 101l are respectively electrically connected to the collectors of the IGBTs 101a to 101f.

The power conversion circuit 11 converts the DC voltage outputted from the converter circuit 100 into a three-phase AC voltage, and supplies this three-phase AC voltage to the motor-generator MG11 when the motor generator MG11 operates as a motor. The power conversion circuit 11 also converts a three-phase AC voltage generated by the motor-generator MG11 into a DC voltage, and supplies this DC voltage to the converter circuit 100 when the motor-generator MG11 operates as a generator. The power conversion circuit 11 includes an inverter circuit 110. The inverter circuit 110 includes IGBTs 110a to 110f and diodes 110g to 110l. The inverter circuit 110 has the same structure as that of the inverter circuit 101. The collectors of the IGBTs 110a to 110c are electrically connected to the positive terminal of the capacitor 100g, and the emitters of the IGBTs 110d to 110f are electrically connected to the negative terminal of the capacitor 100g. The gates of the IGBTs 110a to 110c are respectively electrically connected to high-side drive circuits 130a to 130c (which will be described later), and the gates of the IGBTs 110d to 110f are respectively electrically connected to low-side drive circuits 130d to 130f (which will be described later). A junction of the IGBTs 110a and 110d, a junction of the IGBTs 110b and 110e, and a junction of the IGBTs 110c and 110f are electrically connected to the motor-generator MG11.

The drive circuit 12 is supplied with a voltage used to drive the IGBTs 100c, 100d, and 101a to 101f from the power supply circuit 14, and turns on and off these IGBTs in response to a drive signal received from the power conversion control circuit 18 through the signal transmission circuit 16. The drive circuit 12 includes high-side drive circuits 120a to 120d and low-side drive circuits 120e to 120h.

The high-side drive circuits 120a to 120d are provided to respectively turn and off the high-side IGBTs 100c and 101a to 101c. The high-side drive circuits 120a to 120d are electrically connected to the power supply circuit 14 at their respective voltage input terminals, electrically connected to the signal transmission circuit 16 at their respective drive signal input terminals, and respectively electrically connected to the emitters and gates of the IGBTs 100c and 101a to 101c at their respective output terminals. The low-side drive circuits 120e to 120h are provided to respectively turn and off the low-side IGBTs 100d and 101d to 101f. The low-side drive circuits 120e to 120h are electrically connected to the power supply circuit 14 at their respective voltage input terminals, electrically connected to the signal transmission circuit 16 at their respective drive signal input terminals, and respectively electrically connected to the emitters and gates of the IGBTs 100d and 101d to 101f at their respective output terminals.

The drive circuit 13 is supplied with a voltage used to drive the IGBTs 110a to 110f from the power supply circuit 15, and turns on and off these IGBTs in response to a drive signal received from the power conversion control circuit 19 through the signal transmission circuit 17. The drive circuit 13 includes high-side drive circuits 130a to 130c, and low-side drive circuits 130d to 130f.

The high-side drive circuits 130a to 130c turn on and off the high-side IGBTs 110a to 110c, respectively. The high-side drive circuits 130a to 130c are electrically connected to the power supply circuit 15 at their respective voltage input terminals, electrically connected to the signal transmission circuit 17 at their respective drive signal input terminals, and electrically connected to the emitters and gates of the IGBTs 110a to 110c at their respective output terminals. The low-side drive circuits 130d to 130f turn on and off the low-side IGBTs 110d to 110f, respectively. The low-side drive circuits 130d to 130f are electrically connected to the power supply circuit 15 at their respective voltage input terminals, electrically connected to the signal transmission circuit 17 at their respective drive signal input terminals, and electrically connected to the emitters and gates of the IGBTs 110d to 110f at their respective output terminals.

The power supply circuit 14 supplies a voltage used to drive the IGBTs 100c, 100d, and 101a to 101f to the drive circuit 12. As shown in FIG. 2, the power supply circuit 14 includes a transformer 140, a MOSFET 141 (a switching element), a resistor 142 (a current detection circuit), diodes 143a to 143f, capacitors 144a to 144f, and an output voltage stabilization circuit 145 (a control circuit).

The transformer 140 electrically isolates an AC voltage applied thereto and converts this AC voltage into an AC voltage different from the applied AC voltage. The transformer 140 includes a primary coil 140a, secondary coils 140b to 140f, and a feedback secondary coil 140g. The secondary coils 140b to 140f and the feedback secondary coil 140g have a same turn number. The transformer 140 electrically isolates an AC voltage applied to the primary coil 140a and converts the applied AC voltage into an AC voltage different from the applied AC voltage to output the converted AC voltage from each of the secondary coils 140b to 140f and the feedback secondary coil 140g.

The MOSFET 141 converts a DC voltage supplied from the low-voltage battery B11 (a voltage source) into an AC voltage to supply this AC voltage to the primary coil 140a by being turned on and off. The drain of the MOSFET 141 is electrically connected to a first terminal of the primary coil 140a, and a second terminal (different from the first terminal) of the primary coil 140a is electrically connected to the low-voltage battery B11. The source of the MOSFET 141 is electrically connected to the resistor 142 and further to the vehicle body through the resistor 142. The gate of the MOSFET 141 is electrically connected to the output voltage stabilization circuit 145.

The resistor 142 is an element for detecting a current flowing through the MOSFET 141. More specifically, the resistor 142 converts a current flowing through the MOSFET 141 into a voltage across the resistor 142. A first terminal of the resistor 142 is electrically connected to the source of the MOSFET 141, and a second terminal (different from the first terminal) of the resistor 142 is electrically connected to the vehicle body. Both terminals of the resistor 142 are electrically connected to the output voltage stabilization circuit 145.

Each of the diodes 143a to 143e is an element for rectifying an AC voltage outputted from a corresponding one of the secondary coils 140b to 140f into a DC voltage. The anodes of the diodes 143a to 143e are respectively electrically connected to first terminals of the secondary coils 140b to 140f. The cathodes of the diodes 143a to 143d and second terminals (respectively different from the first terminals) of the secondary coils 140b to 140e are respectively electrically connected to the high-side drive circuits 120a to 120d. The cathode of the diode 143e and the second terminal (different from the first terminal) of the secondary coil 140f are electrically connected to the low-side drive circuits 120e to 120h.

The diode 143f (a feedback rectification circuit) is an element for rectifying an AC voltage outputted from the feedback secondary coil 140g into a DC voltage. The anode of the diode 143f is electrically connected to a first terminal of the feedback secondary coil 140g, and a second terminal (different from the first terminal) of the feedback secondary coil 140g is electrically connected to the vehicle body. In addition, the cathode of the diode 143f is electrically connected to the output voltage stabilization circuit 145.

Each of capacitors 144a to 144f smooths a DC voltage outputted from a corresponding one of the diodes 143a to 143f. First terminals of the capacitors 144a to 144e are respectively electrically connected to the cathodes of the diodes 143a to 143e, and second terminals (respectively different from the first terminals) of the capacitors 144a to 144e are respectively electrically connected to the second terminals of the secondary coils 140b to 140f. A first terminal of a capacitor 144f (a smoothing capacitor) is electrically connected to the cathode of the diode 143f, and a second terminal (different from the first terminal) of the capacitor 144f is electrically connected to the second terminal of the feedback secondary coil 140g and the vehicle body.

The output voltage stabilization circuit 145 controls the MOSFET 141 on the basis of a DC voltage outputted from the diode 143f. The output voltage stabilization circuit 145 further determines whether or not there exists an overcurrent fault on the basis of a current flowing through the MOSFET 141 detected by the resistor 142, that is, a voltage across the resistor 142. The output voltage stabilization circuit 145 is electrically connected to the cathode of the diode 143f and the gate of the MOSFET 141 and further to both the terminals of the resistor 142.

The power supply circuit 15 supplies a voltage used to drive the IGBTs 110a to 110f to the drive circuit 13. As shown in FIG. 3, the power supply circuit 15 includes a transformer 150, MOSFET 151 (a switching element), a resistor 152 (a current detection circuit), diodes 153a to 153e, a capacitors 154a to 154e, and an output voltage stabilization circuit 155 (a control circuit).

The transformer 150 electrically isolates an AC voltage applied thereto and converts this AC voltage into an AC voltage different from the applied AC voltage. The transformer 150 includes a primary coil 150a, secondary coils 150b to 150e, and a feedback secondary coil 150f. The secondary coils 150b to 150e and the feedback secondary coil 150f have a same turn number. The transformer 150 electrically isolates an AC voltage applied to the primary coil 150a and converts this AC voltage into an AC voltage different from the applied AC voltage to output the converted AC voltage from each of the secondary coils 150b to 150e and the feedback secondary coil 150f.

The MOSFET 151 converts a DC voltage supplied from the low-voltage battery B110 into an AC voltage to supply this AC voltage to the primary coil 150a by being turned on and off. The drain of the MOSFET 151 is electrically connected to a first terminal of the primary coil 150a, and a second terminal (different from the first terminal) of the primary coil 150a is electrically connected to the low-voltage battery B110. The source of the MOSFET 151 is electrically connected to the resistor 152 and further to the vehicle body through the resistor 152. The gate of the MOSFET 151 is electrically connected to the output voltage stabilization circuit 155.

The resistor 152 is an element for detecting a current flowing through the MOSFET 151. More specifically, the resistor 152 converts a current flowing through the MOSFET 151 into a voltage. A first terminal of the resistor 152 is electrically connected to the source of the MOSFET 151, and a second terminal (different from the first terminal) of the resistor 152 is electrically connected to the vehicle body. Both the terminals of the resistor 152 are electrically connected to the output voltage stabilization circuit 155.

Each of the diodes 153a to 153d is an element for rectifying an AC voltage outputted from a corresponding one of the secondary coils 150b to 150e into a DC voltage. The anodes of the diodes 153a to 153d are respectively electrically connected to first terminals of the secondary coils 150b to 150e. The cathodes of the diodes 153a to 153c and second terminals (respectively different from the first terminals) of the secondary coils 153b to 150d are respectively electrically connected to high-side drive circuits 130a to 130c. The cathode of the diode 153d and the second terminal of the secondary coil 150e are electrically connected to the low-side drive circuits 130d to 130f.

The diode 153e (a feedback rectification circuit) is an element for rectifying an AC voltage outputted from the feedback secondary coil 150f into a DC voltage. The anode of the diode 153e is electrically connected to a first terminal of the feedback secondary coil 150f, and a second terminal (different from the first terminal) of the feedback secondary coil 150f is electrically connected to the vehicle body. In addition, the cathode of the diode 153e is electrically connected to the output voltage stabilization circuit 155.

Each of capacitors 154a to 154e smooths a DC voltage outputted from a corresponding one of the diodes 153a to 153e. First terminals of the capacitors 154a to 154d are respectively electrically connected to the cathodes of the diodes 153a to 153d, and second terminals (respectively different from the first terminals) of the capacitors 154a to 154d are respectively electrically connected to the second terminals of the secondary coils 150b to 150e. A first terminal of a capacitor 154e (a smoothing capacitor) is electrically connected to the cathode of the diode 153e, and a second terminal (different from the first terminal) of the capacitor 154e is electrically connected to the second terminal of the feedback secondary coil 150f and to the vehicle body.

The output voltage stabilization circuit 155 controls the MOSFET 151 on the basis of a DC voltage rectified by the diode 153e. The output voltage stabilization circuit 155 further determines whether or not there exists an overcurrent fault on the basis of a current flowing through the MOSFET 151 detected by the resistor 152, that is, a voltage across the resistor 152. The output voltage stabilization circuit 155 is electrically connected to the cathode of the diode 153e and the gate of the MOSFET 151 and further to both terminals of the resistor 152.

The signal transmission circuit 16 shown in FIG. 1 is for transmitting the drive signal outputted from the power conversion control circuit 18 to each of the IGBTs 100c, 100d and 101a to 101f in an electrically isolated manner. The signal transmission circuit 16 includes high-side photocouplers 160a to 160d and low-side photocouplers 160e to 160h.

The high-side photocouplers 160a to 160d transmit the drive signal to the high-side drive circuits 120a to 120d, respectively. The drive signal input terminals of the high-side photocouplers 160a to 160d are electrically connected to the power conversion control circuit 18. The drive signal output terminals of the high-side photocouplers 160a to 160d are respectively electrically connected to the drive signal input terminals of the high-side drive circuits 120a to 120d. The low-side photocouplers 160e to 160h transmit the drive signal to the low-side drive circuits 120e to 120h. The drive signal input terminals of the low-side photocouplers 160e to 160h are electrically connected to the power conversion control circuit 18. The drive signal output terminals of the low-side photocouplers 160e to 160h are respectively electrically connected to the drive signal input terminals of the low-side drive circuits 120e to 120h.

The signal transmission circuit 17 is for transmitting the drive signal outputted from the power conversion control circuit 19 to the IGBTs 110a to 110f in an electrically isolated manner. The signal transmission circuit 17 includes high-side photocouplers 170a to 170c and low-side photocouplers 170d to 170f.

The high-side photocouplers 170a to 170c transmit the drive signal to the high-side drive circuits 130a to 130c. The drive signal input terminals of the high-side photocouplers 170a to 170c are electrically connected to the power conversion control circuit 19. The drive signal output terminals of the high-side photocouplers 170a to 170c are respectively electrically connected to the drive signal input terminals of the high-side drive circuits 130a to 130c. The low-side photocouplers 170d to 170f transmit the drive signal to the low-side drive circuits 130d to 130f. The drive signal input terminals of the low-side photocouplers 170d to 170f are electrically connected to the power conversion control circuit 19. The drive signal output terminals of the low-side photocouplers 170d to 170f are respectively electrically connected to the drive signal input terminals of the low-side drive circuits 130d to 130f.

The power conversion control circuit 18 turns on and off the IGBT 100d in the converter circuit 100 to perform the voltage step-up operation, and turns on and off the IGBTs 101a to 101f in the inverter circuit 101 to convert a DC voltage into a three-phase AC voltage when the motor-generator MG10 operates as a motor. The power conversion control circuit 18 also turns on and off the IGBT 100c in the converter circuit 100 to perform the voltage step-down operation when the motor generators MG10 and MG11 each operate as a generator. The power conversion control circuit 18 includes a microcomputer which generates the drive signal to turn on and off the IGBTs 100c, 100d and 101a to 101f in response to detection results from the rotation angle sensor S10 and the current sensor S12. The input terminal of the power conversion control circuit 18 is electrically connected to the output terminals of the rotation angle sensor S10 and the current sensor S12. The drive signal output terminal of the power conversion control circuit 18 is electrically connected to the drive signal input terminals of the high-side photocouplers 160a to 160d and the low-side photocouplers 160e to 160h.

The power conversion control circuit 19 turns on and off the IGBTs 110a to 110f in the inverter circuit 110 to convert a DC voltage outputted from the converter circuit 100 into a three-phase AC voltage when the motor-generator MG11 operates as a motor. The power conversion control circuit 19 includes a microcomputer which generates the drive signal to turn on and off the IGBTs 110a to 110f in response to detection results from the rotation angle sensor S11 and the current sensor 513. The input terminal of the power conversion control circuit 19 is electrically connected to the output terminals of the rotation angle sensor S11 and the current sensor S13. The drive signal output terminals of the power conversion control circuit 19 are electrically connected to the drive signal input terminals of the high-side photocouplers 170a to 170c and the low-side photocouplers 170d to 170f.

Figure 4:
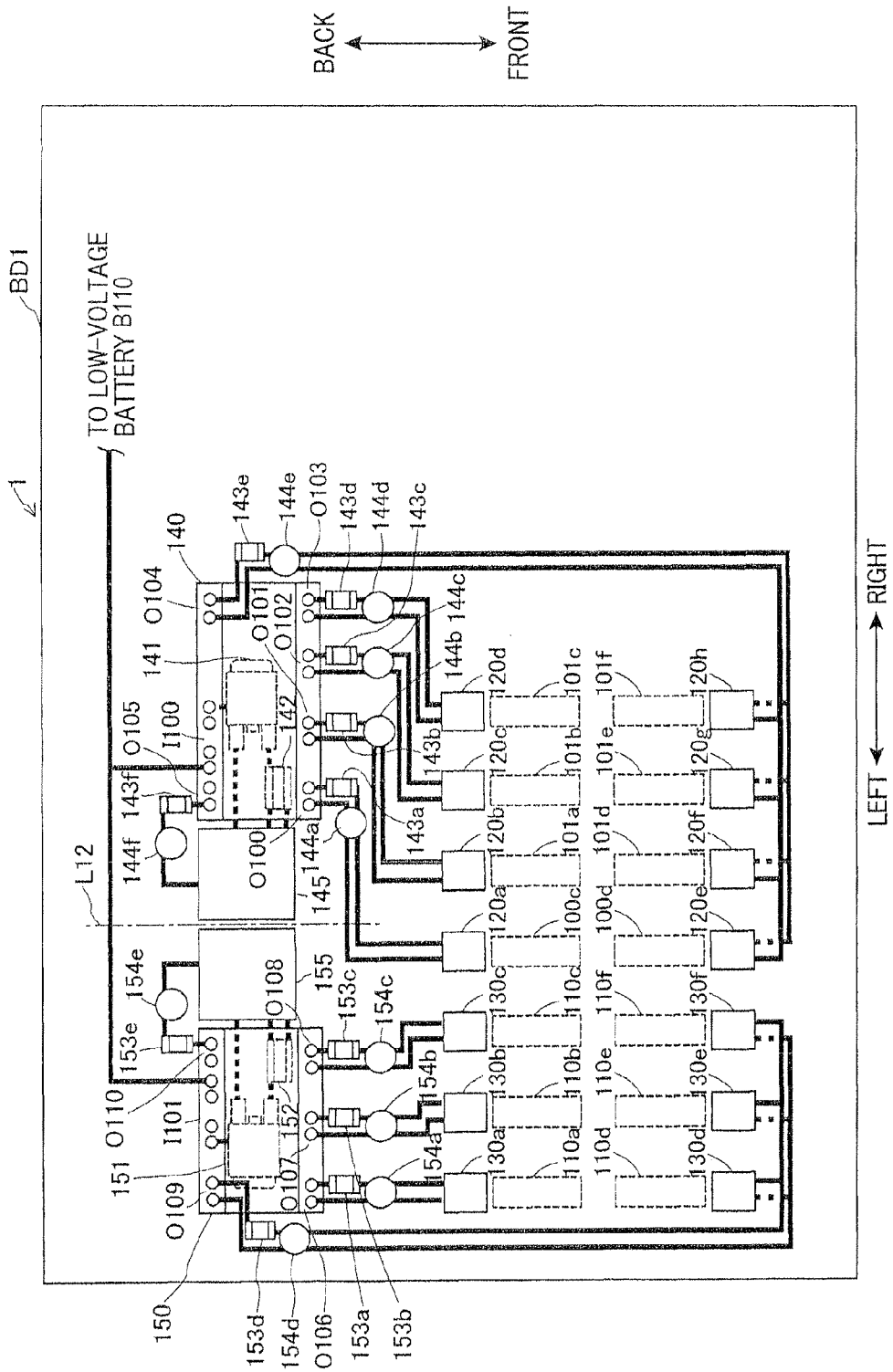
FIG. 4 is a top view of a wiring board of the motor-generator control apparatus of the first embodiment.
Figure 5:
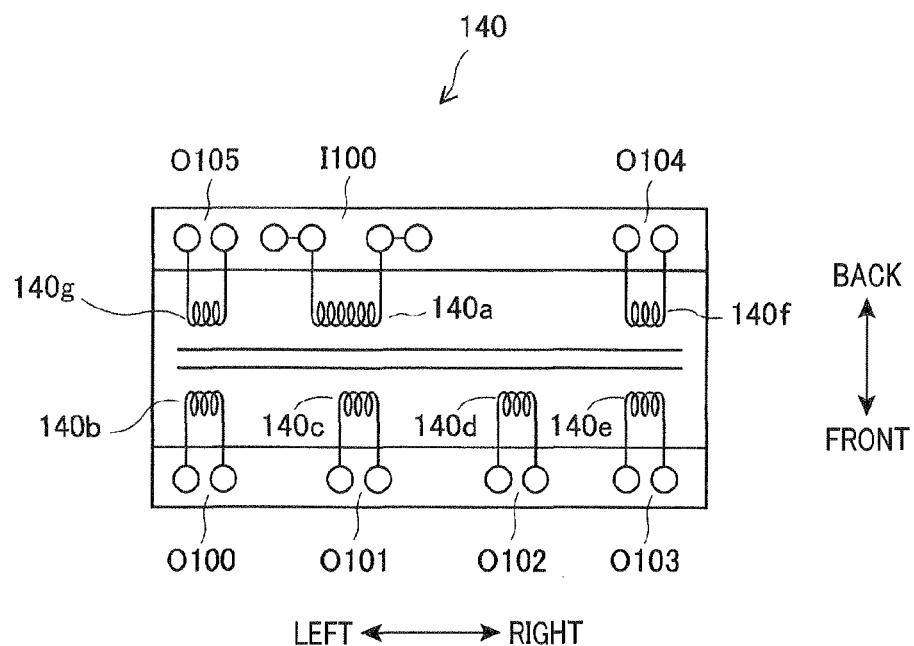
FIG. 5 is a top view of a first transformer of the motor-generator control apparatus of the first embodiment.
Figure 6:
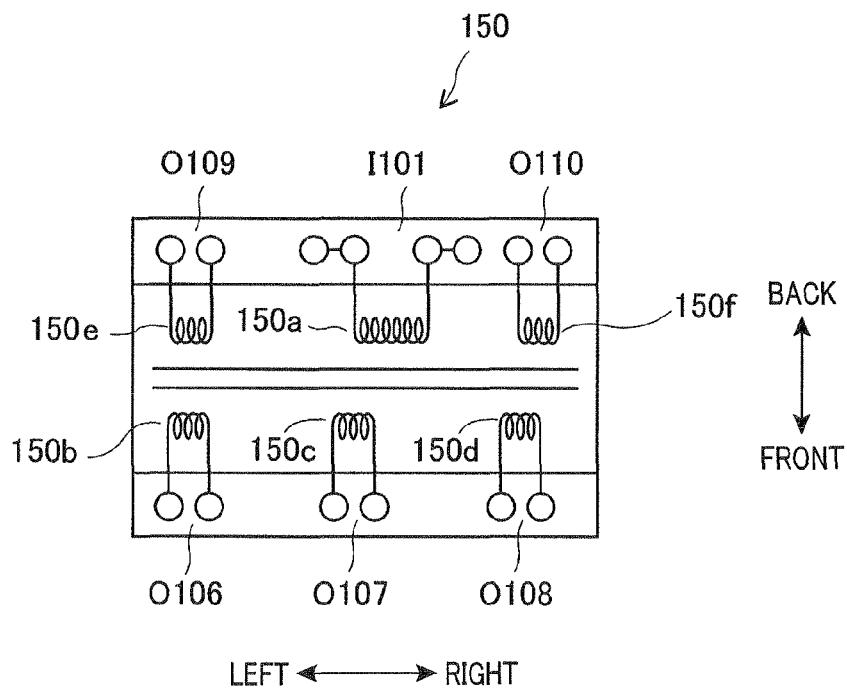
FIG. 6 is a top view of a second transformer of the motor-generator control apparatus of the first embodiment.
Figure 7:
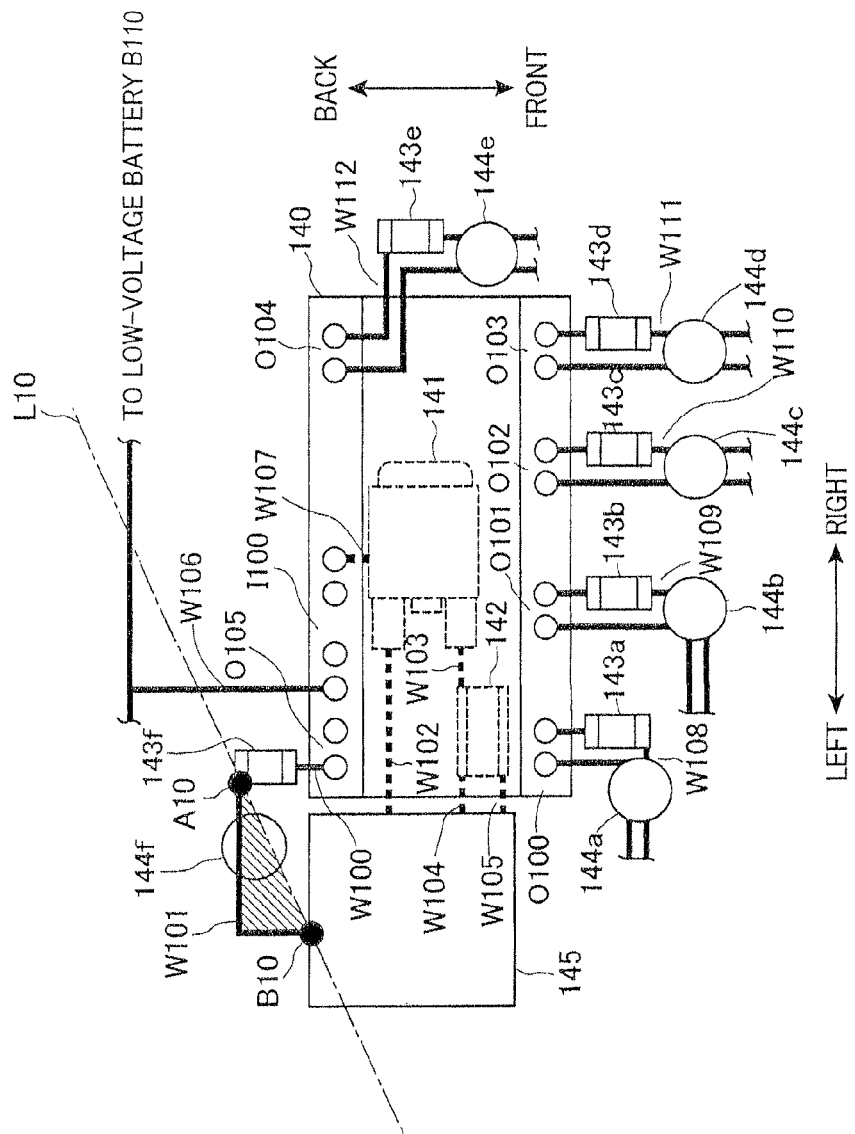
FIG. 7 is an expanded view around the first transformer of the motor-generator control apparatus of the first embodiment.
Figure 8:
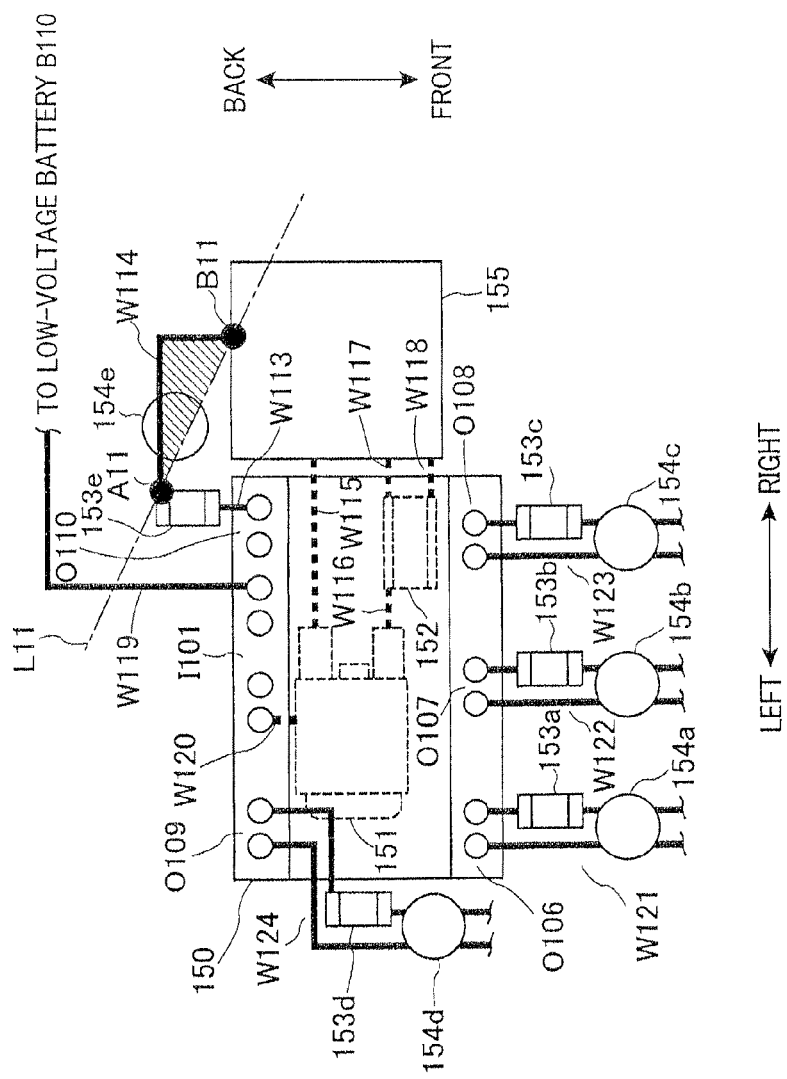
FIG. 8 is an expanded view around the second transformer of the motor-generator control apparatus of the first embodiment.

There will now be explained a layout of the main components of the motor-generator control apparatus 1 and wirings therebetween with reference to FIGS. 4 to 6. FIG. 4 is a top view of a rectangular wiring board BD1, and shows only wiring patterns around the power supply circuits. The wiring patterns on the top surface of the wiring board BD1 are shown by heavy solid lines. The wiring patterns on the bottom surface of the wiring board BD1 are shown by heavy dashed lines. FIG. 5 is a top view of the transformer 140 (a first transformer). FIG. 6 is a top view of the transformer 150 (a second transformer). In FIGS. 5 and 6, the primary coils, the feedback secondary coils, the secondary coils (other than the feedback secondary coils) are shown by thin lines. FIG. 7 shows an expanded view around the transformer 140 shown in FIG. 4, and FIG. 8 shows an expanded view around the transformer 150 shown in FIG. 4. In FIGS. 7 and 8, the wiring patterns on the top surface of the wiring board BD1 are shown by heavy solid lines, and the wiring patterns on the bottom surface of the wiring board BD1 are shown heavy dashed lines. The "front-back direction" (vertical direction) and "left-right direction" (horizontal direction) in FIGS. 4 to 8 are used for illustration purposes only.

As shown in FIG. 4, the high-side IGBTs 110a to 110c, 100c, and 101a to 101c are mounted in a row in the left-to-right direction in this order on the bottom surface of the wiring board BD1. The low-side IGBTs 110d to 110f, 100d, and 101d to 101f are mounted in a row in the left-to-right direction in this order on the bottom surface of the wiring board BD1.

The high side drive circuits 120a to 120d are mounted on the top surface of the wiring board BD1 so as to be located backward of and side by side with the high side IGBTs 100c, and 101a to 101c, respectively. The low side drive circuits 120e to 120h are mounted on the top surface of the wiring board BD1 so as to be located forward of and side by side with the low side IGBTs 100d, and 101d to 101f, respectively.

The high side drive circuits 130a to 130c are mounted on the top surface of the wiring board BD1 so as to be located backward of and side by side with the high side IGBTs 110a to 110c, respectively. The low side drive circuits 130d to 130f are mounted on the top surface of the wiring board BD1 so as to be located forward of and side by side with the low side IGBTs 110d to 110f, respectively.

As shown in FIG. 5, the transformer 140 includes pairs of output terminals O100 to O103 for the secondary coils 140b to 140e arranged in a row in the left-to-right direction in this order on the front side of the transformer 140. The transformer 140 further includes a pair of output terminals O105 (a pair of connection terminals) of the feedback secondary coil 140g, a pair of input terminals I100 (a pair of connection terminals) of the primary coil 140a, and a pair of output terminals O104 (a pair of connection terminals) of the secondary coil 140f arranged in a row in the left-to-right direction in this order on the back side of the transformer 140.

As shown in FIG. 4, the transformer 140 is mounted on the top surface of the wiring board BD1 so as to be located backward right of the row of the high-side IGBTs 100c and 101a to 101c.

The MOSFET 141 is mounted on the bottom surface of the wiring board BD1 so as to be located opposite to the transformer 140. The drain, gate, and source of the MOSFET 141 are on its left side surface. The drain of the MOSFET 141 is bent to project upwardly (i.e., in the bottom-to-top direction), and the gate and source of the MOSFET 151 project leftward in the left-right direction.

The resistor 142 is mounted on the bottom surface of the wiring board BD1 so as to be located opposite to the transformer 140 and leftward of the MOSFET 141, where one connection terminal of the resistor 142 is on the back side and the other connection terminal of the resistor 142 is on the front side.

The diodes 143a to 143f are mounted on the top surface of the wiring board BD1. Each of the diodes 143a to 143d is located forward of a corresponding pair of the pairs of output terminals O100 to O103, where the anode of the diode is on the back side and the cathode of the diode is on the front side. The diode 143e is located rightward of transformer 140, where the anode of the diode 143e is on the back side and the cathode of the diode 143e is on the front side. The diode 143f is located backward of the pair of output terminals O105, where the anode of the diode 143f is on the front side and the cathode of the diode 143f is on the back side.

The capacitors 144a to 144f are mounted on the top surface of the wiring board BD1. The capacitor 144a is located leftward of the diode 143a. Each of the capacitors 144b to 144e is located forward of a corresponding one of the diodes 143b to 143e. The capacitor 144f is located leftward of the diode 143f.

The output voltage stabilization circuit 145 is mounted on the top surface of the wiring board BD1 so as to be located leftward of the transformer 140.

As shown in FIG. 7, a wiring pattern W100, which electrically connects the feedback secondary coil 140g and the diode 143f, is formed on the top surface of the wiring board BD1. More specifically, in the wiring pattern W100, a wiring extends backward (i.e., in the front-to-back direction) from a first one of the pair of connection terminals O105 of the feedback secondary coil 140g to the anode of the diode 143f.

A wiring pattern W101, which electrically connects the diode 143f and the output voltage stabilization circuit 145, is formed on the top surface of the wiring board BD1. The wiring pattern W101 lies in a back-side region of an imaginary line L10 (preferably, a straight line) running through a junction A10 of the wiring pattern W101 and the diode 143f (i.e., the cathode of the diode 143f) and a junction B10 of the wiring pattern W101 and the output voltage stabilization circuit 145. More specifically, in the wiring pattern W101, a wiring extends leftward (i.e., in the right-to-left direction) from the junction A10 and turns left to further extend forward (i.e., in the back-to-front direction) to the junction B10. The capacitor 144f is located leftward of the diode 143f and electrically connected between the wiring and the vehicle body in the wiring pattern W101.

A wiring pattern W102, which electrically connects the output voltage stabilization circuit 145 and the MOSFET 141, is formed on the bottom surface of the wiring board BD1 and outside a shaded area enclosed by the imaginary line L10 and the wiring pattern W101. More specifically, in the wiring pattern W102, a wiring extends rightward (i.e., in the left-to-right direction) from the output voltage stabilization circuit 145 to the gate of the MOSFET 141.

A wiring pattern W103, which electrically connects the MOSFET 141 and the resistor 142, is formed on the bottom surface of the wiring board BD1 and outside the shaded area enclosed by the imaginary line L10 and the wiring pattern W101. More specifically, the wiring pattern W103 lies forward of and in parallel with the wiring pattern W102, where a wiring extends leftward from the source of the MOSFET 141 to the back-side connection terminal of the resistor 142.

Wiring patterns W104, W105, each of which electrically connects the resistor 142 and the output voltage stabilization circuit 145, are formed on the bottom surface of the wiring board BD1 and outside the shaded area enclosed by the imaginary line L10 and the wiring pattern W101. More specifically, each of the wiring patterns W104, W105 lies forward of and in parallel with the wiring pattern W102. In the wiring pattern W104, a wiring extends leftward from the back-side connection terminal of the resistor 142 to the output voltage stabilization circuit 145. In the wiring pattern W105, a wiring extends leftward from the front-side connection terminal of the resistor 142 to the output voltage stabilization circuit 145.

A wiring pattern W106, which electrically connects the low-voltage battery B11 and a first one of the pair of connection terminals I100 of the primary coil 140a, is formed on the top surface of the wiring board BD1 and outside the shaded area enclosed by the imaginary line L10 and the wiring pattern W101. More specifically, in the wiring pattern W106, a wiring extends leftward from the low-voltage battery B11 and turns left to further extend forward to the first one of the pair of connection terminals I100 of the primary coil 140a.

A wiring pattern W107, which electrically connects the primary coil 140a and the MOSFET 141, is formed on the bottom surface of the wiring board BD1 and outside the shaded area enclosed by the imaginary line L10 and the wiring pattern W101. More specifically, in the wiring pattern W107, a wiring extends forward from a second one (different from the first one) of the pair of connection terminals I100 of the primary coil 140a to the drain of the MOSFET 141.

Wiring patterns W108 to W112, each of which electrically connects one of the secondary coils 140b to 140f to one of the diodes 143a to 143e and one of the capacitors 144a to 144e, are formed on the top surface of the wiring board BD1. More specifically, in each of the wiring patterns W108 to W111, one of a pair of wirings extends forward from one of a pair of connection terminals of a corresponding one of the secondary coils 140b to 140e to a corresponding one of the capacitors 144a to 144d through a corresponding one of the diodes 143a to 143d, and the other of the pair of wirings extends forward from the other of the pair of connection terminals of the corresponding one of the secondary coils 140b to 140e to the corresponding one of the capacitors 144a to 144d. In the wiring pattern W112, one of a pair of wirings extends forward from one of the pair of connection terminals O104 of the secondary coil 140f and turns left under the transformer 140 to further extend rightward to the capacitor 144e through the diode 143e, and the other of the pair of wirings extends forward from the other of the pair of connection terminals O104 of the secondary coil 140f and turns left under the transformer 140 to further extend rightward to the capacitor 144e.

As shown in FIG. 6, the transformer 150 includes pairs of output terminals O106 to O108 of the secondary coils 150b to 150d arranged in a row in the left-to-right direction in this order on the front side. The transformer 150 further includes a pair of output terminals O110 (a pair of connection terminals) of the feedback secondary coil 150f, a pair of input terminals I101 (a pair of connection terminals) of the primary coil 150a, and a pair of output terminals O109 (a pair of connection terminals) of the secondary coil 150e arranged in a row in the right-to-left direction in this order on the back side.

As shown in FIG. 4, the transformer 150 is mounted on the top surface of the wiring board BD1 so as to be located backward of the row of the high-side IGBTs 110a to 110c.

The MOSFET 151 is mounted on the bottom surface of the wiring board BD1 so as to be located opposite to the transformer 150. The drain, gate, and source of the MOSFET 151 are on its right side surface. The drain of the MOSFET 151 is bent to project upwardly and the gate and source of the MOSFET 151 project rightward in the left-right direction.

The resistor 152 is mounted on the bottom surface of the wiring board BD1 so as to be located opposite to the transformer 150 and rightward of the MOSFET 151, where one connection terminal of the resistor 152 is on the back side and the other connection terminal of the resistor 142 is on the front side.

The diodes 153a to 153e are mounted on the top surface of the wiring board BD1. Each of the diodes 153a to 153c is located forward of a corresponding pair of the pairs of output terminals O106 to O108, where the anode of the diode is on the back side and the cathode of the diode is on the front side. The diode 153d is located leftward of transformer 150, where the anode of the diode 153d is on the back side and the cathode of the diode 153d is on the front side. The diode 153e is located backward of the pair of output terminals O110, where the anode of the diode 153e is on the front side and the cathode of the diode 153e is on the back side.

The capacitors 154a to 154e are mounted on the top surface of the wiring board BD1. Each of the capacitors 154a to 154d is located forward of a corresponding one of the diodes 153a to 153d. The capacitor 154e is located rightward of the diode 153e.

The output voltage stabilization circuit 155 is mounted on the top surface of the wiring board BD1 so as to be located rightward of the transformer 150.

As shown in FIG. 8, a wiring pattern W113, which electrically connects the feedback secondary coil 150f and the diode 153e, is formed on the top surface of the wiring board BD1. More specifically, in the wiring pattern W113, a wiring extends backward (i.e., in the front-to-back direction) from a first one of the pair of connection terminals O110 of the feedback secondary coil 150f to the anode of the diode 153e.

A wiring pattern W114, which electrically connects the diode 153e and the output voltage stabilization circuit 155, is formed on the top surface of the wiring board BD1. The wiring pattern W114 lies in a back-side region of an imaginary line L11 (preferably, a straight line) running through a junction A11 of the wiring pattern W114 and the diode 153e (i.e., the cathode of the diode 153e) and a junction B11 of the wiring pattern W114 and the output voltage stabilization circuit 155. More specifically, in the wiring pattern W114, a wiring extends rightward (i.e., in the left-to-right direction) from the junction A11 and turns right to further extend forward (i.e., in the back-to-front direction) to the junction B11. The capacitor 154e is located rightward of the diode 153e and electrically connected between the wiring and the vehicle body in the wiring pattern W114.

A wiring pattern W115, which electrically connects the output voltage stabilization circuit 155 and the MOSFET 151, is formed on the bottom surface of the wiring board BD1 and outside a shaded area enclosed by the imaginary line L11 and the wiring pattern W114. More specifically, in the wiring pattern W115, a wiring extends leftward (i.e., in the right-to-left direction) from the output voltage stabilization circuit 155 to the gate of the MOSFET 151.

A wiring pattern W116, which electrically connects the MOSFET 151 and the resistor 152, is formed on the bottom surface of the wiring board BD1 and outside the shaded area enclosed by the imaginary line L11 and the wiring pattern W114. More specifically, the wiring pattern W116 lies forward of and in parallel with the wiring pattern W115, where a wiring extends rightward from the source of the MOSFET 151 to the back-side connection terminal of the resistor 152.

Wiring patterns W117, W118, each of which electrically connects the resistor 152 and the output voltage stabilization circuit 155, are formed on the bottom surface of the wiring board BD1 and outside the shaded area enclosed by the imaginary line L11 and the wiring pattern W114. More specifically, each of the wiring patterns W117, W118 lies forward of and in parallel with the wiring pattern W115. In the wiring pattern W117, a wiring extends rightward from the back-side connection terminal of the resistor 152 to the output voltage stabilization circuit 155. In the wiring pattern W118, a wiring extends rightward from the front-side connection terminal of the resistor 152 to the output voltage stabilization circuit 155.

A wiring pattern W119, which electrically connects the low-voltage battery B110 and a first one of the pair of connection terminals I101 of the primary coil 150a, is formed on the top surface of the wiring board BD1 and outside the shaded area enclosed by the imaginary line L11 and the wiring pattern W114. More specifically, in the wiring pattern W119, a wiring extends leftward from the low-voltage battery B110 and turns left to further extend forward to the first one of the pair of connection terminals I101 of the primary coil 150a.

A wiring pattern W120, which electrically connects the primary coil 150a and the MOSFET 151, is formed on the bottom surface of the wiring board BD1 and outside the shaded area enclosed by the imaginary line L11 and the wiring pattern W114. More specifically, in the wiring pattern W120, a wiring extends forward from a second one (different from the first one) of the pair of connection terminals I101 of the primary coil 150a to the drain of the MOSFET 151.

Wiring patterns W121 to W124, each of which electrically connects one of the secondary coils 150b to 150e to one of the diodes 153a to 153d and one of the capacitors 154a to 154d, are formed on the top surface of the wiring board BD1. More specifically, in each of the wiring patterns W121 to W123, one of a pair of wirings extends forward from one of a pair of connection terminals of a corresponding one of the secondary coils 150b to 150d to a corresponding one of the capacitors 154a to 154c through a corresponding one of the diodes 153a to 153c, and the other of the pair of wirings extends forward from the other of the pair of connection terminals of the corresponding one of the secondary coils 150b to 150d to the corresponding one of the capacitors 154a to 154c. In the wiring pattern W124, one of a pair of wirings extends forward from one of the pair of connection terminals O109 of the secondary coil 150e and turns right under the transformer 150 to further extend leftward to the capacitor 154d through the diode 153d, and the other of the pair of wirings extends forward from the other of the pair of connection terminals O109 of the secondary coil 150e and turns right under the transformer 150 to further extend leftward to the capacitor 154d.

It should be noted that a set of the wiring patterns W101 to W105 of the power supply circuit 14 and a set of the wiring patterns W114 to W118 of the power supply circuit 15 are symmetric to each other with respect to an imaginary line L12 (preferably, a straight line) running in the front-back direction.

There will now be explained an operation of the motor-generator control apparatus 1 with reference to FIGS. 1 to 3.

Referring to FIG. 1, the power supply circuits 14 generates a voltage to drive the IGBTs 100c, 100d, 101a to 101f, and the power supply circuits 15 generates a voltage to drive the IGBTs 110a to 110f. Referring to FIG. 2, the output voltage stabilization circuit 145 of the power supply circuit 14 turns on and off the MOSFET 141 to convert a DC voltage of the low voltage battery B110 into an AC voltage to be applied to the primary coil 140a of the transformer 140. When the primary coil 140a is applied with the AC voltage, an AC voltage is outputted from each of the secondary coils 140b to 140f and the feedback secondary coil 140g, where the AC voltage outputted from each of the secondary coils 140b to 140f and the feedback secondary coil 140g takes a value depending on its turn number. The AC voltage outputted from each of the secondary coils 140b to 140f is converted into a DC voltage by being rectified by a corresponding one of the diodes 143a to 143e, which is then smoothed by a corresponding one of the capacitors 144a to 144e. The AC voltage outputted from the feedback secondary coil 140g is converted into a DC voltage by being rectified by the diode 143f, which is then smoothed by the capacitor 144f. The output voltage stabilization circuit 145 adjusts timings to turn on and off the MOSFET 141 so that the DC voltage rectified by the diode 143f is kept at a predetermined voltage. Repeating these operations can lead to stabilized voltage supply. A similar explanation can also be applied to the power supply circuit 15 shown in FIG. 3. Each of the output voltage stabilization circuits 145, 155 is configured to stop a switching operation of a corresponding one of the MOSFETs 141, 151 when it is determined that there exists an overcurrent fault therein.

Referring to FIG. 1, when each of the motor-generators MG10 and MG11 operates as a motor, the power conversion control circuit 18 turns on the IGBT 100d to cause the coil 100b to accumulate energy from the high voltage battery B100. Subsequently, the power conversion control circuit 18 turns off the IGBT 100d to discharge the energy stored in the coil 100b. At this time, the voltage at a first terminal of the coil 100b electrically connected to the IGBTs 100c and 100d becomes higher than the voltage at a second terminal of the coil 100b electrically connected to the capacitor 100a. That is, the voltage at the first terminal of the coil 100b becomes higher than the voltage of the high voltage battery B100. At this time, since the IGBTs 100c and 100d are both off, a current generated by discharge of the energy from the coil 100b flows into the capacitor 100g through the diode 100e to charge the capacitor 100g. The power conversion control circuit 18 turns on and off the IGBT 100d repeatedly so that the voltage of the capacitor 100g is kept at a predetermined voltage.

The power conversion control circuit 18 turns on and off the IGBTs 101a to 101f at their respective predetermined timings in response to external instructions and detection results from the rotation angle sensor S10 and the current sensor S12 in order to convert a voltage of the capacitor 100g into a three-phase AC voltage to be supplied to the motor-generator MG10. The power conversion control circuit 19 also turns on and off the IGBTs 110a to 110f at their respective predetermined timings in response to external instructions and detection results from the rotation angle sensor S11 and the current sensor S13 in order to convert the voltage of the capacitor 100g into a three-phase AC voltage to be supplied to the motor-generators MG11. Each of the motor-generators MG10 and MG11 operates as a motor to generate a torque when supplied with the three-phase AC voltage from a corresponding one of the respective inverter circuits 101 and 102.

On the other hand, when each of the motor-generators MG10 and MG11 operates as a generator, a corresponding one of the inverter circuits 101 and 110 converts a three-phase AC voltage generated by the motor-generator into a DC voltage through a corresponding one of rectification circuits respectively including a set of the diodes 101g to 101l and a set of the diodes 110g to 110l. The capacitor 100g is charged by this DC voltage.

The power conversion control circuit 18 turns on the IGBT 100c to cause the coil 100b to accumulate energy from the capacitor 100g. Subsequently, the power conversion control circuit 18 turns off the IGBT 100c to cause the coil 100b to discharge the energy accumulated therein. At this time, the voltage at the second terminal of the coil 100b electrically connected to the capacitor 100a becomes higher than the voltage at the first of the coil 100b electrically connected to the IGBTs 100c and 100d. That is, a voltage at the first terminal of the coil 100b becomes lower than a voltage of the capacitor 100a. At this time, since the IGBTs 100c and 100d are both off, a current generated by discharge of the energy from the coil 100b flows into the high voltage battery B100 through the diode 100f to charge the high voltage battery B100. The power conversion control circuit 18 turns on and off the IGBT 100c repeatedly so that the voltage of the high voltage battery B100 is kept at a predetermined voltage.

There will now been explained some advantages of the first embodiment.

In the power supply circuit 14, a pulse signal for turning on and off the MOSFET 141 is transmitted through the wiring pattern W102 that electrically connects the output voltage stabilization circuit 145 and the MOSFET 141. When the wiring pattern W101 that electrically connects the diode 143f and the output voltage stabilization circuit 145 crosses the wiring pattern W102, noise caused by the pulse signal will be superimposed on a control signal transmitted through the wiring pattern W102, which may prevent the MOSFET 141 from being controlled properly on the basis of the DC voltage outputted from the diode 143f. In the first embodiment, however, the wiring pattern W102 is formed outside the shaded area enclosed by the wiring pattern W101 and the imaginary line L10 running through the junction A10 of the wiring pattern W101 and the diode 143f and the junction B100 of the wiring pattern W101 and the output voltage stabilization circuit 145. This can prevent the wiring pattern W101 and the wiring pattern W102 from crossing each other, which thus can suppress adverse effects of noise caused by the pulse signal. Therefore, in the first embodiment, the MOSFET 141 can be controlled properly on the basis of the DC voltage outputted from the diode 143f in the power conversion apparatus mounted in the vehicle. A similar effect may be furnished also in the power supply circuit 15.

In the first embodiment, the capacitor 144f is electrically connected to the diode 143f via the wiring pattern W101 that electrically connects the diode 143f and the output voltage stabilization circuit 145 in the power supply circuit 14. This allows the DC voltage outputted from the diode 143f to be smoothed without being adversely affected by noise associated with the pulse signal. A similar effect may be furnished also in the power supply circuit 15.

In the power supply circuit 14, a pulsed current flows through the wiring pattern W103 that electrically connects the MOSFET 141 and the resistor 142. In addition, a pulsed signal associated with the switching operation of the MOSFET 141 is transmitted through the wiring patterns W104, W105. When the wiring pattern W101 that electrically connects the diode 143f and the output voltage stabilization circuit 145 crosses at least one of the wiring patterns W103 to W105, noise caused by the pulsed current and/or signal will be superimposed on a control signal transmitted through the wiring pattern W101, which may prevent the MOSFET 141 from being controlled properly on the basis of the DC voltage outputted from the diode 143f. In the first embodiment, however, the wiring patterns W103 to W105 are formed outside the shaded area enclosed by the wiring pattern W101 and the imaginary line L10 running through the junction A10 of the wiring pattern W101 and the diode 143f and the junction B10 of the wiring pattern W101 and the output voltage stabilization circuit 145. This can prevent the wiring pattern W101 and the wiring patterns W103 to W105 from crossing each other, which thus can suppress adverse effects of noise caused by the pulsed current and/or signal. Therefore, in the first embodiment, the MOSFET 141 can be controlled properly on the basis of the DC voltage outputted from the diode 143f in the power conversion apparatus mounted in the vehicle. A similar effect may be furnished also in the power supply circuit 15.

In the first embodiment, the wiring pattern W103 that electrically connects the MOSFET 141 and the resistor 142 and the wiring patterns W104, W105 that each connect the resistor 142 and the output voltage stabilization circuit 145 extend in parallel with the wiring pattern W102 that electrically connects the output voltage stabilization circuit 145 and the MOSFET 141 in the power supply circuit 14. This can allow the wiring patterns W103 to W105 to be installed efficiently while preventing the wiring patterns W103 to W105 from crossing the wiring pattern W101. A similar effect may be furnished also in the power supply circuit 15.

In the power supply circuit 14, a pulsed current associated with the switching operation of the MOSFET 141 flows through each of the wiring pattern W106 that electrically connects the low-voltage battery B110 and (the first terminal of) the primary coil 140a and the wiring pattern W107 that electrically connects (the second terminal of) the primary coil 140a and the MOSFET 141. When the wiring pattern W101 that electrically connects the diode 143f and the output voltage stabilization circuit 145 crosses at least one of the wiring patterns W106, W107, noise caused by the pulsed current will be superimposed on a control signal transmitted through the wiring pattern W101, which may prevent the MOSFET 141 from being controlled properly on the basis of the DC voltage outputted from the diode 143f. In the first embodiment, however, the wiring patterns W106, W107 are formed outside the shaded area enclosed by the wiring pattern W101 and the imaginary line L10 running through the junction A10 of the wiring pattern W101 and the diode 143f and the junction B10 of the wiring pattern W101 and the output voltage stabilization circuit 145. This can prevent the wiring pattern W101 and the wiring patterns W106, W107 from crossing each other, which thus can suppress adverse effects of noise caused by the pulsed current. Therefore, in the first embodiment, the MOSFET 141 can be controlled properly on the basis of the DC voltage outputted from the diode 143f in the power conversion apparatus mounted in the vehicle. A similar effect may be furnished also in the power supply circuit 15.

In the first embodiment, the pair of output terminals O105 of the feedback secondary coil 140g, the pair of input terminals I100 of the primary coil 140a, and the pair of output terminals O104 of the secondary coil 140f are arranged in a row in the left-to-right direction in this order in the power supply circuit 14. This facilitates formation of the wiring patterns other than the wiring pattern W101 that electrically connects the diode 143f and the output voltage stabilization circuit 145 outside the shaded area enclosed by the wiring pattern W101 and the imaginary line L10 running through the junction A10 of the wiring pattern W101 and the diode 143f and the junction B10 of the wiring pattern W101 and the output voltage stabilization circuit 145. Similarly, in the power supply circuit 15, the pair of output terminals O110 of the feedback secondary coil 150f, the pair of input terminals I101 of the primary coil 150a, and the pair of output terminals O109 of the secondary coil 150e are arranged in a row in the right-to-left direction in this order, which leads to a similar effect.

In the first embodiment, in the wiring pattern W112, one of a pair of wirings extends forward from one of the pair of connection terminals O104 of the secondary coil 140f and turns left under the transformer 140 to further extend rightward to the capacitor 144e through the diode 143e, and the other of the pair of wirings extends forward from the other of the pair of connection terminals O104 of the secondary coil 140f and turns left under the transformer 140 to further extend rightward to the capacitor 144e. Use of a region on the top surface of the board BD 1 and under the transformer 140 can lead to a higher packaging density. Similarly, in the wiring pattern W124, one of a pair of wirings extends forward from one of the pair of connection terminals O109 of the secondary coil 150e and turns right under the transformer 150 to further extend leftward to the capacitor 154d through the diode 153d, and the other of the pair of wirings extends forward from the other of the pair of connection terminals O109 of the secondary coil 150e and turns right under the transformer 150 to further extend leftward to the capacitor 154d, which leads to a similar effect.

In the first embodiment, a first set of wiring patterns in the power supply circuit 14 including the wiring pattern W101 that electrically connects the diode 143f and the output voltage stabilization circuit 145, the wiring pattern W102 that electrically connects the output voltage stabilization circuit 145 and the MOSFET 141, the wiring pattern W103 that electrically connects the MOSFET 141 and the resistor 142, the wiring patterns W104, W105 that each connect the resistor 142 and the output voltage stabilization circuit 145 and a second set of wiring patterns in the power supply circuit 15 including the wiring pattern W114 that electrically connects the diode 153e and the output voltage stabilization circuit 155, the wiring pattern W115 that electrically connects the output voltage stabilization circuit 155 and the MOSFET 151, the wiring pattern W116 that electrically connects the MOSFET 151 and the resistor 152, and the wiring patterns W117, W118 that each electrically connect the resistor 152 and the output voltage stabilization circuit 155 are symmetric to each other with respect to an imaginary line L12 running in front-back direction. This allows impedances of the two sets of wiring patterns to be equal to each other, which leads to equal characteristics between the power supply circuits 14, 15.

(Second Embodiment)

There will now be explained a motor-generator control apparatus 2 in the second embodiment of the present invention. The motor-generator control apparatus 2 of the second embodiment is different from the motor-generator control apparatus 1 of the first embodiment in that a pair of output voltage stabilization circuits are located backward of the respectively corresponding transformers and wiring patterns are installed accordingly.

Figure 9:
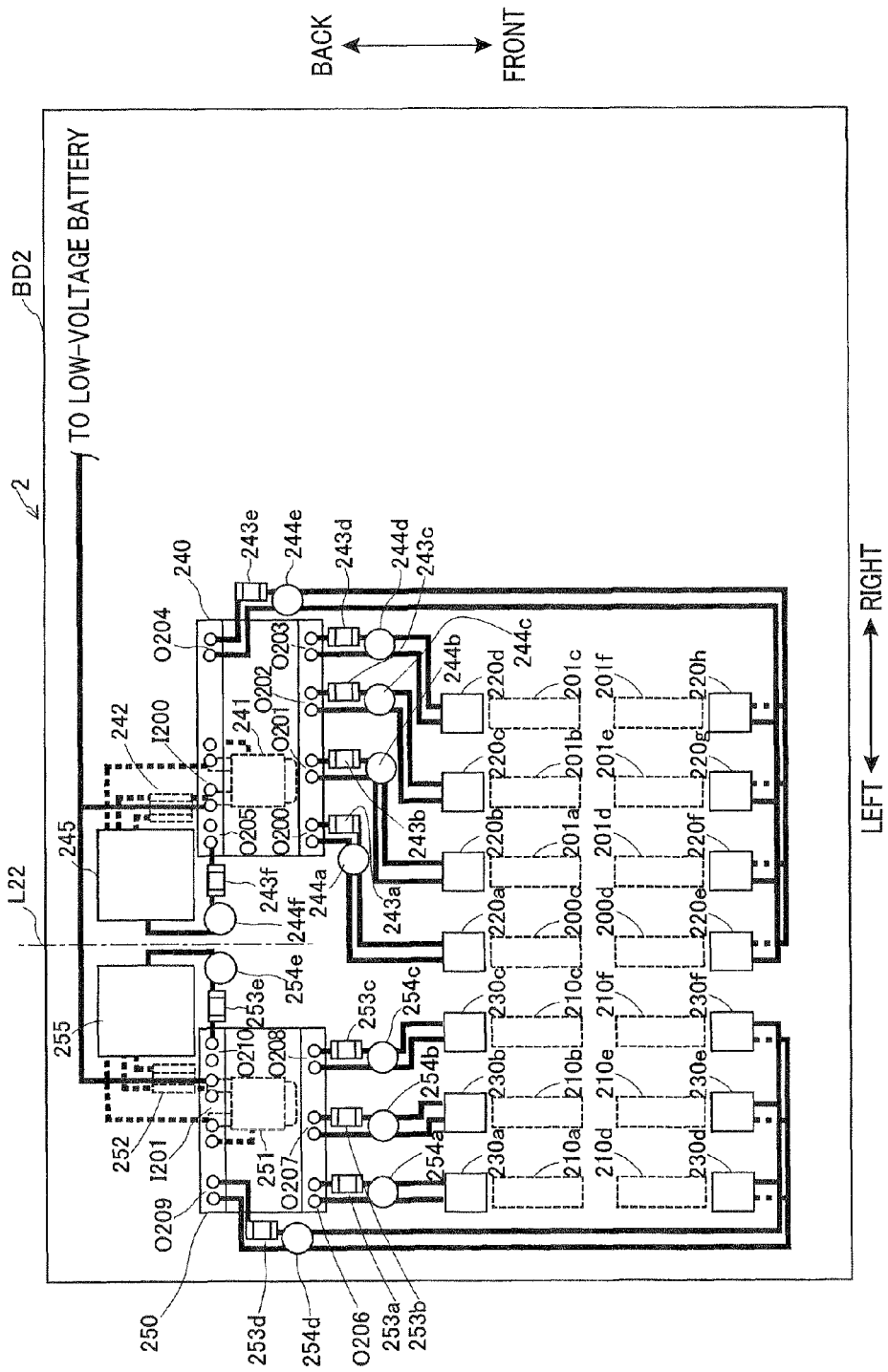
FIG. 9 is a top view of a wiring board of a motor-generator control apparatus in accordance with a second embodiment of the present invention.
Figure 10:
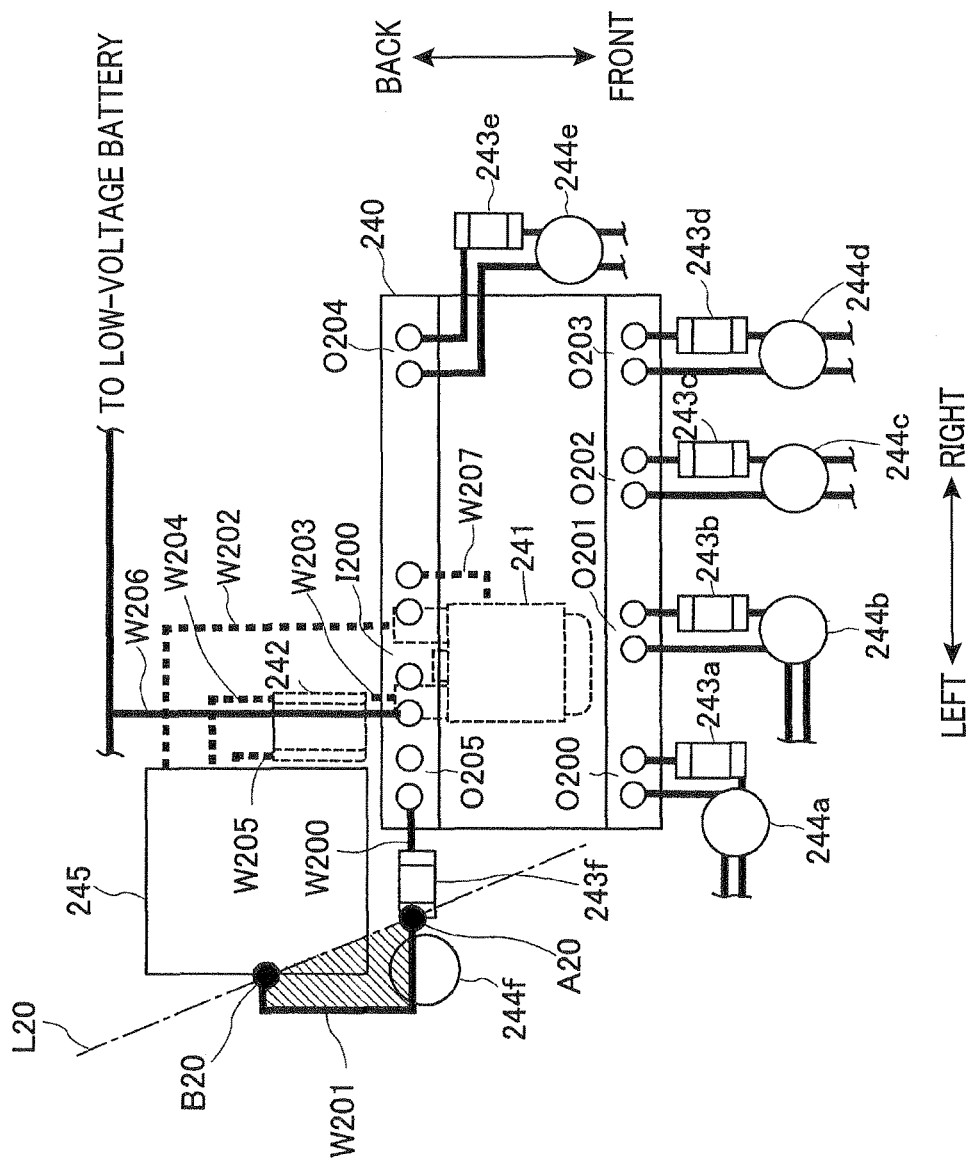
FIG. 10 is an expanded view around a first transformer of the motor-generator control apparatus of the second embodiment.
Figure 11:
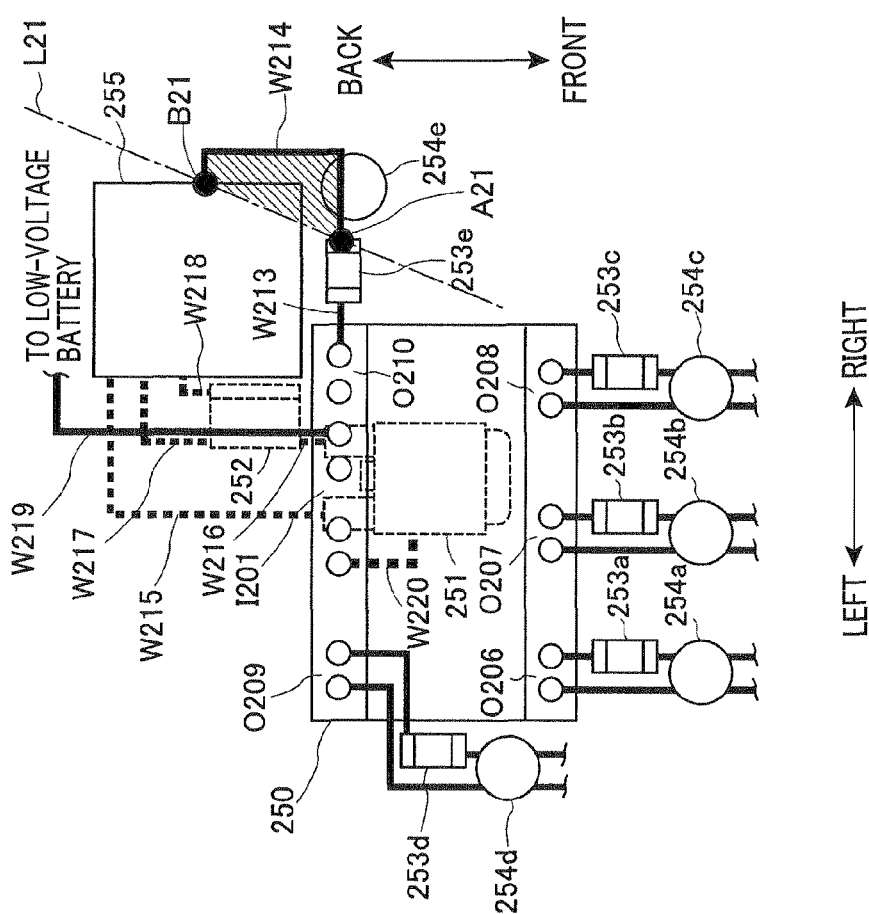
FIG. 11 is an expanded view around a second transformer of the motor-generator control apparatus of the second embodiment.

There will now be explained a layout of main components of the motor-generator control apparatus 2 and wirings therebetween with reference to FIGS. 9 to 11. FIG. 9 is a top view of a wiring board BD2 of the motor-generator control apparatus 2, and shows only wiring patterns around the power supply circuits. The wiring patterns on the top surface of the wiring board BD2 are shown by heavy solid lines. The wiring patterns on the bottom surface of the wiring board BD2 are shown by heavy dashed lines. FIG. 10 shows an expanded view around the transformer 240 (a first transformer) shown in FIG. 9, and FIG. 11 shows an expanded view around the transformer 250 (a second transformer) shown in FIG. 9. In FIGS. 10 and 11, the wiring patterns on the top surface of the wiring board are shown by heavy solid lines, and the wiring patterns on the bottom surface of the wiring board are shown by heavy dashed lines. The "front-back direction" and "left-right direction" in FIGS. 9 to 11 are used for illustration purposes only. Only differences of the second embodiment from the first embodiment will be explained with respect to the layout of main components of the motor-generator control apparatus 2 and the wirings therebetween.

A circuit diagram of the motor-generator control apparatus 2 of the second embodiment shown in FIG. 9 is identical to the circuit diagram shown in FIG. 1 of the motor-generator control apparatus 1 of the first embodiment shown in FIG. 4. That is, an arrangement of high side IGBTs 200c, 201a to 201c, 210a to 210c, low side IGBTs 200d, 201d to 201f, 210d to 210f, high side drive circuits 220a to 220d, 230a to 230c, low side drive circuits 220e to 220h, 230d to 230f, transformers 240, 250, diodes 243a to 243e, 253a to 253d and capacitors 244a to 244e, 254a to 254d is identical to the arrangement of the high side IGBTs 100c, 101a to 101c, 110a to 110c, the low side IGBTs 100d, 101d to 101f, 110d to 110f, the high side drive circuits 120a to 120d, 130a to 130c, the low side drive circuits 120e to 120h, 130d to 130f, the transformers 140, 150, the diodes 143a to 143e, 153a to 153d and the capacitors 144a to 144e, 154a to 154d. The circuit diagram shown in FIG. 9 also includes output terminals O200-O210.

The MOSFET 241 is mounted on the bottom surface of the wiring board BD2 so as to be located opposite to the transformer 240. The drain, gate, and source of the MOSFET 241 are on its back side surface. The drain of the MOSFET 241 is bent to project upwardly, and the gate and source of the MOSFET 241 project backward in the front-to back direction.

The resistor 242 is mounted on the bottom surface of the wiring board BD2 so as to be located backward of a portion of the bottom surface opposite to the transformer 240. The resistor 242 is disposed backward of the MOSFET 241 with one connection terminal of the resistor 242 being on the right side and the other connection terminal of the resistor 142 being on the left side.

The diode 243f is mounted on the top surface of the wiring board BD2 so as to be located leftward of a pair of output terminals O205 with the anode of the diode 243f being on the right side and the cathode of the diode 243f being on the left side.

The capacitor 244f is mounted on the top surface of the wiring board BD2 so as to be located leftward of the diode 243f.

The output voltage stabilization circuit (control circuit) 245 is mounted on the top surface of the wiring board BD2 so as to be located backward left of the transformer 240.

As shown in FIG. 10, a wiring pattern W200, which electrically connects the feedback secondary coil and the diode 243f, is formed on the top surface of the wiring board BD2. More specifically, in the wiring pattern W200, a wiring extends leftward from one of a pair of connection terminals O205 of the feedback secondary coil to the anode of the diode 243f.

A wiring pattern W201, which electrically connects the diode 243f and the output voltage stabilization circuit 245, is formed on the top surface of the wiring board BD2. The wiring pattern W201 lies in a left-side region of an imaginary line L20 (preferably, a straight line) running through a junction A20 of the wiring pattern W201 and the diode 243f (i.e., the cathode of the diode 243f) and a junction B20 of the wiring pattern W201 and the output voltage stabilization circuit 245. More specifically, in the wiring pattern W201, a wiring extends leftward (i.e., in the right-to-left direction) from the junction A20 and turns right to further extend backward (i.e., in the front-to-back direction) to the junction B20. The capacitor 244f is located leftward of the diode 243f and electrically connected between the wiring and the vehicle body in the wiring pattern W201.

A wiring pattern W202, which electrically connects the output voltage stabilization circuit 245 and the MOSFET 241, is formed on the bottom surface of the wiring board BD2 and outside a shaded area enclosed by the imaginary line L20 and the wiring pattern W201. More specifically, in the wiring pattern W202, a wiring extends rightward (i.e., in the left-to-right direction) from the output voltage stabilization circuit 245 and turns right to further extend forward to the gate of the MOSFET 241.

A wiring pattern W203, which electrically connects the MOSFET 241 and the resistor 242, is formed on the bottom surface of the wiring board BD2 and outside the shaded area enclosed by the imaginary line L20 and the wiring pattern W201. More specifically, the wiring pattern W203 lies leftward of and in parallel with the wiring pattern W202, where a wiring extends backward from the source of the MOSFET 241 to the right-side connection terminal of the resistor 242.

Wiring patterns W204, W205, each of which electrically connects the resistor 242 and the output voltage stabilization circuit 245, are formed on the bottom surface of the wiring board BD2 and outside the shaded area enclosed by the imaginary line L20 and the wiring pattern W201. More specifically, each of the wiring patterns W204, W205 lies leftward of and in parallel with the wiring pattern W202. In the wiring pattern W204, a wiring extends backward from the right-side connection terminal of the resistor 242 and turns left to further extend leftward to the output voltage stabilization circuit 245. In the wiring pattern W205, a wiring extends backward from the left-side connection terminal of the resistor 242 and turns left to further extend leftward to the output voltage stabilization circuit 245.

A wiring pattern W206, which electrically connects the low-voltage battery and a first one of the pair of connection terminals I200 of the primary coil, is formed on the top surface of the wiring board BD2 and outside the shaded area enclosed by the imaginary line L20 and the wiring pattern W201. More specifically, in the wiring pattern W206, a wiring extends leftward from the low-voltage battery and turns left to further extend forward to the first one of the pair of connection terminals I200 of the primary coil.

A wiring pattern W207, which electrically connects the primary coil and the MOSFET 241, is formed on the bottom surface of the wiring board BD2 and outside the shaded area enclosed by the imaginary line L20 and the wiring pattern W201. More specifically, in the wiring pattern W207, a wiring extends forward from a second one (different from the first one) of the pair of connection terminals I200 of the primary coil and turns right to further extend leftward to the drain of the MOSFET 241.

As shown in FIG. 9, the MOSFET 251 is mounted on the bottom surface of the wiring board BD2 so as to be located opposite to the transformer 250. The drain, gate, and source of the MOSFET 251 are on its back side surface. The drain of the MOSFET 251 is bent project upwardly, and the gate and source of the MOSFET 251 project backward in the front-back direction.

The resistor 252 is mounted on the bottom surface of the wiring board BD2 so as to be located backward of a portion of the bottom surface opposite to the transformer 250. The resistor 252 is disposed backward of the MOSFET 251 with one connection terminal of the resistor 252 being on the left side and the other connection terminal of the resistor 252 being on the right side.

The diode 253e is mounted on the top surface of the wiring board BD2 so as to be located rightward of a pair of output terminals O210 with the anode of the diode 253e being on the left side and the cathode of the diode 253e being on the right side.

The capacitor 254e is mounted on the top surface of the wiring board BD2 so as to be located rightward of the diode 253e.

The output voltage stabilization circuit (control circuit) 255 is mounted on the top surface of the wiring board BD2 so as to be located backward right of the transformer 250.

As shown in FIG. 11, a wiring pattern W213, which electrically connects the feedback secondary coil and the diode 253e, is formed on the top surface of the wiring board BD2. More specifically, in the wiring pattern W213, a wiring extends rightward (i.e., in the left-to-right direction) from a first one of the pair of connection terminals O210 of the feedback secondary coil to the anode of the diode 253e.

A wiring pattern W214, which electrically connects the diode 253e and the output voltage stabilization circuit 255, is formed on the top surface of the wiring board BD2. The wiring pattern W214 lies in a right-side region of an imaginary line L21 (preferably, a straight line) running through a junction A21 of the wiring pattern W214 and the diode 253e (i.e., the cathode of the diode 253e) and a junction B21 of the wiring pattern W214 and the output voltage stabilization circuit 255. More specifically, in the wiring pattern W214, a wiring extends rightward (i.e., in the left-to-right direction) from the junction A21 and turns left to further extend backward (i.e., in the front-to-back direction) and again turns left to further extend leftward to the junction B21. The capacitor 254e is located rightward of the diode 253e and electrically connected between the wiring and the vehicle body in the wiring pattern W214.

A wiring pattern W215, which electrically connects the output voltage stabilization circuit 255 and the MOSFET 251, is formed on the bottom surface of the wiring board BD2 and outside a shaded area enclosed by the imaginary line L21 and the wiring pattern W214. More specifically, in the wiring pattern W215, a wiring extends leftward (i.e., in the right-to-left direction) from the output voltage stabilization circuit 255 and turns left to further extend forward to the gate of the MOSFET 251.

A wiring pattern W216, which electrically connects the MOSFET 251 and the resistor 252, is formed on the bottom surface of the wiring board BD2 and outside the shaded area enclosed by the imaginary line L21 and the wiring pattern W214. More specifically, the wiring pattern W216 lies rightward of and in parallel with the wiring pattern W215, where a wiring extends backward from the source of the MOSFET 251 to the left-side connection terminal of the resistor 252.

Wiring patterns W217, W218, each of which electrically connects the resistor 252 and the output voltage stabilization circuit 255, are formed on the bottom surface of the wiring board BD2 and outside the shaded area enclosed by the imaginary line L21 and the wiring pattern W214. More specifically, each of the wiring patterns W217, W218 lies rightward of and in parallel with the wiring pattern W215. In the wiring pattern W217, a wiring extends backward from the left-side connection terminal of the resistor 252 and turns right to further extend rightward to the output voltage stabilization circuit 255. In the wiring pattern W218, a wiring extends backward from the right-side connection terminal of the resistor 252 and turns right to further extend rightward to the output voltage stabilization circuit 255.

A wiring pattern W219, which electrically connects the low-voltage battery and a first one of the pair of connection terminals I201 of the primary coil, is formed on the top surface of the wiring board BD2 and outside the shaded area enclosed by the imaginary line L21 and the wiring pattern W214. More specifically, in the wiring pattern W219, a wiring extends leftward from the low-voltage battery and turns left to further extend forward to the first one of the pair of connection terminals I201 of the primary coil.

A wiring pattern W220, which electrically connects the primary coil and the MOSFET 251, is formed on the bottom surface of the wiring board BD2 and outside the shaded area enclosed by the imaginary line L21 and the wiring pattern W214. More specifically, in the wiring pattern W220, a wiring extends forward from a second one (different from the first one) of the pair of connection terminals I201 of the primary coil and turns left to further extend rightward to the drain of the MOSFET 251.

It should be noted that a set of wiring patterns W201 to W205 of the power supply circuit 24 and a set of wiring patterns W214 to W218 of the power supply circuit 25 are symmetric to each other with respect to an imaginary line L22 (preferably, a straight line) running in the front-back direction.

According to the second embodiment, similar effects to the first embodiment are furnished. Specifically to the second embodiment, the output voltage stabilization circuits are disposed backward of the respectively corresponding transformers, which leads to reduction in horizontal dimension of a mounting region for the motor-generator control apparatus as compared to the first embodiment. This can ensures enough room for other circuits to be mounted on a right side portion of the wiring board.

(Third Embodiment)

There will now be explained a motor-generator control apparatus 3 in accordance with a third embodiment of the present invention. The motor-generator control apparatus 3 of the third embodiment is different from the motor-generator control apparatus 1 of the first embodiment in that a pair of output voltage stabilization circuits are mounted on the bottom surface of the wiring board so as to be located opposite to the respectively corresponding transformers and wiring patterns are installed accordingly.

Figure 12:
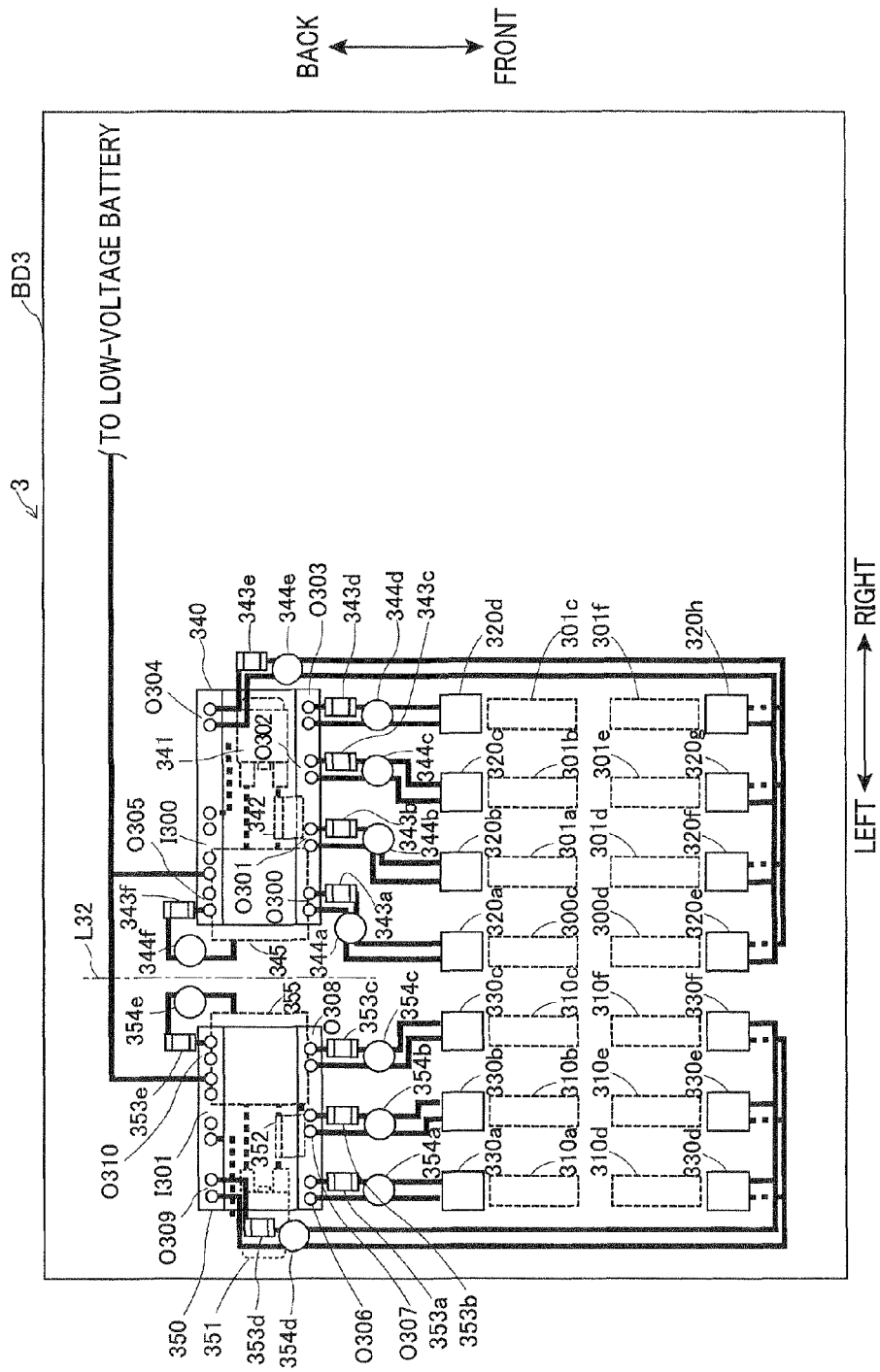
FIG. 12 is a top view of a wiring board of a motor-generator control apparatus in accordance with a third embodiment of the present invention.
Figure 13:
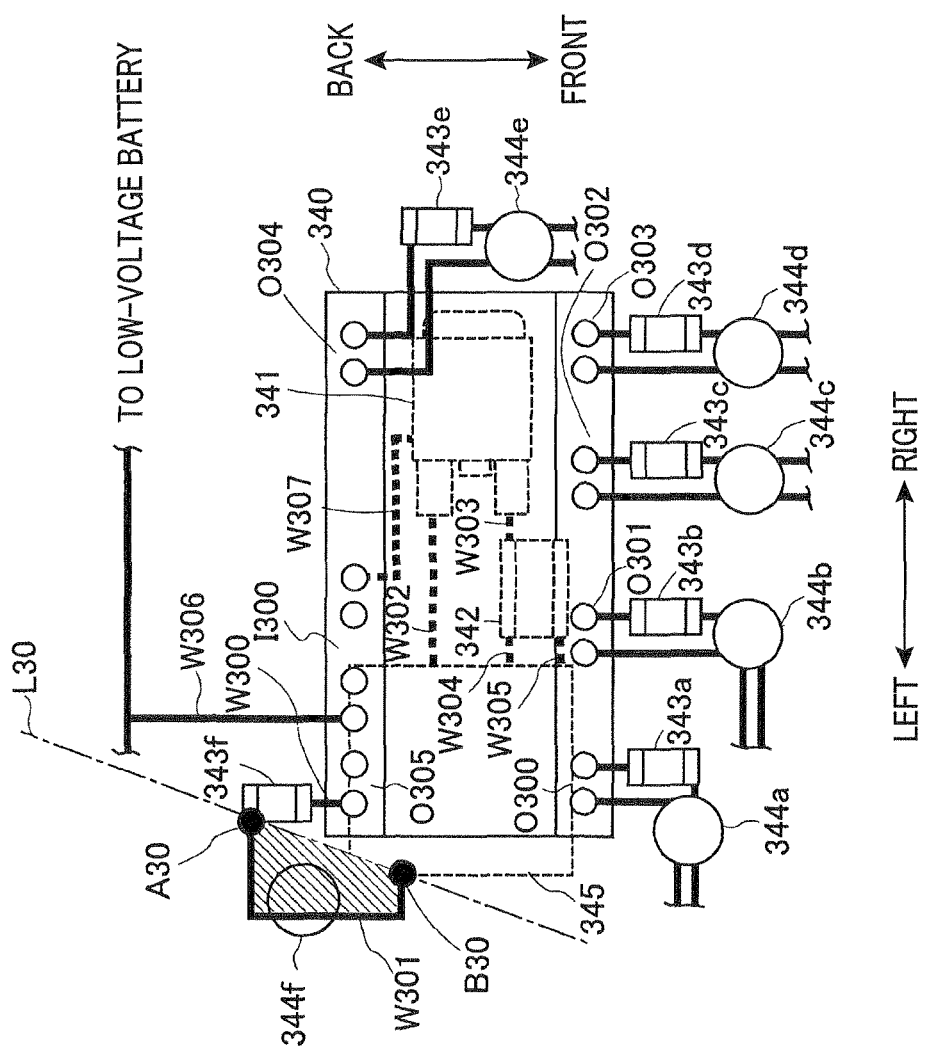
FIG. 13 is an expanded view around a first transformer of the motor-generator control apparatus of the third embodiment.
Figure 14:
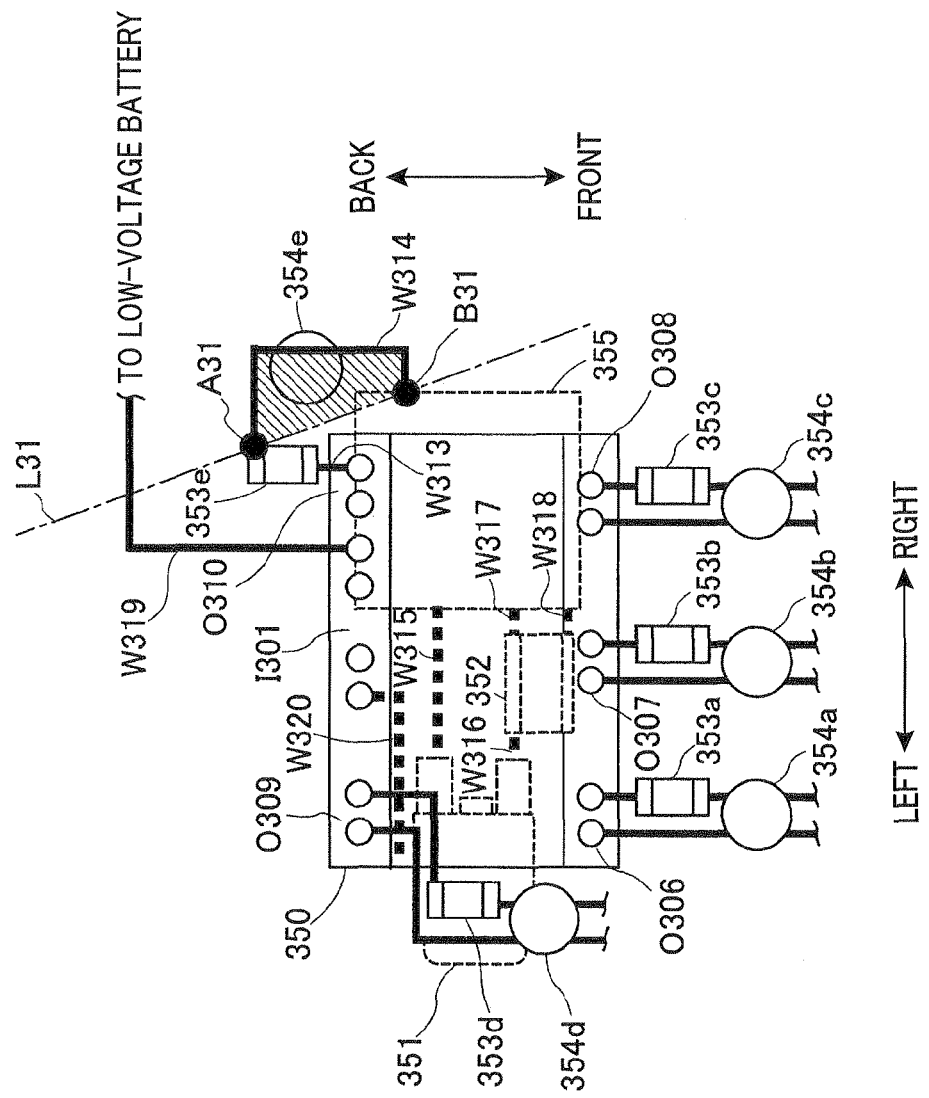
FIG. 14 is an expanded view around a second transformer of the motor-generator control apparatus of the third embodiment.

There will now be explained a layout of main components of the motor-generator control apparatus 3 and wirings therebetween with reference to FIGS. 12 to 14. FIG. 12 is a top view of the wiring board BD3 of the motor-generator control apparatus 3, and shows only wiring patterns around the power supply circuits. The wiring patterns on the top surface of the wiring board BD3 are shown by heavy solid lines. The wiring patterns on the bottom surface of the wiring board BD3 are shown by heavy dashed lines. FIG. 13 shows an expanded view around the transformer 340 (a first transformer) shown in FIG. 12, and FIG. 14 shows an expanded view around the transformer 350 (a second transformer) shown in FIG. 12. In FIGS. 13 and 14, the wiring patterns on the top surface of the wiring board BD3 are shown by heavy solid lines and the wiring patterns on the bottom surface of the wiring board BD3 are shown heavy dashed lines. The "front-back direction" and "left-right direction" in FIGS. 12 to 14 are used for illustration purposes only. Only differences of the third embodiment from the first embodiment will be explained with respect to the layout of main components of the motor-generator control apparatus 3 and the wirings therebetween.

A circuit diagram of the motor-generator control apparatus 3 of the third embodiment shown in FIG. 12 is identical to the circuit diagram shown in FIG. 1 of the motor-generator control apparatus 1 of the first embodiment shown in FIG. 4. That is, an arrangement of high side IGBTs 300c, 301a to 301c, 310a to 310c, low side IGBTs 300d, 301d to 301f, 310d to 310f, high side drive circuits 320a to 320d, 330a to 330c, low side drive circuits 320e to 320h, 330d to 330f, transformers 340, 350, diodes 343a to 343e, 353a to 353d and capacitors 344a to 344e, 354a to 354d is identical to the arrangement of the high side IGBTs 100c, 101a to 101c, 110a to 110c, the low side IGBTs 100d, 101d to 101f, 110d to 110f, the high side drive circuits 120a to 120d, 130a to 130c, the low side drive circuits 120e to 120h, 130d to 130f, the transformers 140, 150, the diodes 143a to 143e, 153a to 153d and the capacitors 144a to 144e, 154a to 154d. The circuit diagram shown in FIG. 12 also includes output terminals O300-O310.

The MOSFET 341 is mounted on the bottom surface of the wiring board BD3 so as to be located opposite to the transformer 340. The drain, gate, and source of the MOSFET 341 are on its left side surface. The drain of the MOSFET 341 is bent to project upwardly (i.e., in the bottom-to-top direction), and the gate and source of the MOSFET 341 project leftward in the left-right direction.

The resistor 342 is mounted on the bottom surface of the wiring board BD3 so as to be located opposite to the transformer 340 and leftward of the MOSFET 341, where one connection terminal of the resistor 342 is on the back side and the other connection terminal of the resistor 342 is on the front side.

The diode 343f is mounted on the top surface of the wiring board BD3 so as to be located backward of a pair of output terminals O305 with the anode of the diode 343f being on the front side and the cathode of the diode 343f being on the back side.

The capacitor 344f is mounted on the top surface of the wiring board BD3 so as to be located leftward of the diode 343f.

The output voltage stabilization circuit (control circuit) 345 is mounted on the bottom surface of the wiring board BD3 so as to be located leftward of the resistor 342 and opposite to the transformer 340.

As shown in FIG. 13, a wiring pattern W300, which electrically connects the feedback secondary coil and the diode 343f, is formed on the top surface of the wiring board BD3. More specifically, the wiring pattern W300 extends backward from one of a pair of connection terminals O305 of the feedback secondary coil to the anode of the diode 343f.

A wiring pattern W301, which electrically connects the diode 343f and the output voltage stabilization circuit 345, is formed on the top surface of the wiring board BD3. The wiring pattern W301 lies in a left-side region of an imaginary line L30 (preferably, a straight line) running through a junction A30 of the wiring pattern W301 and the diode 343f (i.e., the cathode of the diode 343f) and a junction B30 of the wiring pattern W301 and the output voltage stabilization circuit 345. More specifically, in the wiring pattern W301, a wiring extends leftward (i.e., in the right-to-left direction) from the junction A30 and turns left to further extend forward (i.e., in the back-to-front direction) and again turns left to further extend rightward to the junction B30. The capacitor 344f is located leftward of the diode 343f and electrically connected between the wiring and the vehicle body in the wiring pattern W301.

A wiring pattern W302, which electrically connects the output voltage stabilization circuit 345 and the MOSFET 341, is formed on the bottom surface of the wiring board BD3 and outside a shaded area enclosed by the imaginary line L30 and the wiring pattern W301. More specifically, in the wiring pattern W302, a wiring extends rightward (i.e., in the left-to-right direction) from the output voltage stabilization circuit 345 to the gate of the MOSFET 341.

A wiring pattern W303, which electrically connects the MOSFET 341 and the resistor 342, is formed on the bottom surface of the wiring board BD3 and outside the shaded area enclosed by the imaginary line L30 and the wiring pattern W301. More specifically, the wiring pattern W303 lies forward of and in parallel with the wiring pattern W302, where a wiring extends leftward from the source of the MOSFET 341 to the back-side connection terminal of the resistor 342.

Wiring patterns W304, W305, each of which electrically connects the resistor 342 and the output voltage stabilization circuit 345, are formed on the bottom surface of the wiring board BD3 and outside the shaded area enclosed by the imaginary line L30 and the wiring pattern W301. More specifically, each of the wiring patterns W304, W305 lies forward of and in parallel with the wiring pattern W302. In the wiring pattern W304, a wiring extends leftward from the back-side connection terminal of the resistor 342 to the output voltage stabilization circuit 345. In the wiring pattern W305, a wiring extends leftward from the front-side connection terminal of the resistor 342 to the output voltage stabilization circuit 345.

A wiring pattern W306, which electrically connects the low-voltage battery and a first one of the pair of connection terminals I300 of the primary coil, is formed on the top surface of the wiring board BD3 and outside the shaded area enclosed by the imaginary line L30 and the wiring pattern W301. More specifically, in the wiring pattern W306, a wiring extends leftward from the low-voltage battery and turns left to further extend forward to the first one of the pair of connection terminals I300 of the primary coil.

A wiring pattern W307, which electrically connects the primary coil and the MOSFET 341, is formed on the bottom surface of the wiring board BD3 and outside the shaded area enclosed by the imaginary line L30 and the wiring pattern W301. More specifically, in the wiring pattern W307, a wiring extends forward from a second one (different from the first one) of the pair of connection terminals I300 of the primary coil and turns left to further extend rightward and again turns right to further extend forward to the drain of the MOSFET 341.

As shown in FIG. 12, the MOSFET 351 is mounted on the bottom surface of the wiring board BD3 so as to be located opposite to the transformer 350. The drain, gate, and source of the MOSFET 351 are on its right side surface. The drain of the MOSFET 351 is bent to project upwardly, and the gate and source of the MOSFET 351 project rightward in the left-right direction.

The resistor 352 is mounted on the bottom surface of the wiring board BD3 so as to be located opposite to the transformer 350 and rightward of the MOSFET 351, where one connection terminal of the resistor 352 is on the back side and the other connection terminal of the resistor 342 is on the front side.

The diode 353e is mounted on the top surface of the wiring board BD3 so as to be located backward of a pair of output terminals O310 with the anode of the diode 353e being on the front side and the cathode of the diode 353e being on the back side.

The capacitor 354e is mounted on the top surface of the wiring board BD3 so as to be located rightward of the diode 353e.

The output voltage stabilization circuit (control circuit) 355 is mounted on the bottom surface of the wiring board BD3 so as to be located rightward of the resistor 352 and opposite to the transformer 350.

As shown in FIG. 14, a wiring pattern W313, which electrically connects the feedback secondary coil and the diode 353e, is formed on the top surface of the wiring board BD3. More specifically, in the wiring pattern W313, a wiring extends backward (i.e., in the front-to-back direction) from a first one of the pair of connection terminals O310 of the feedback secondary coil to the anode of the diode 353e.

A wiring pattern W314, which electrically connects the diode 353e and the output voltage stabilization circuit 355, is formed on the top surface of the wiring board BD3. The wiring pattern W314 lies in a right-side region of an imaginary line L31 (preferably, a straight line) running through a junction A31 of the wiring pattern W314 and the diode 353e (i.e., the cathode of the diode 353e) and a junction B31 of the wiring pattern W314 and the output voltage stabilization circuit 355. More specifically, in the wiring pattern W314, a wiring extends rightward (i.e., in the left-to-right direction) from the junction A31 and turns right to further extend forward (i.e., in the back-to-front direction) and again turns right to further extend leftward to the junction B31. The capacitor 354e is located rightward of the diode 353e and electrically connected between the wiring and the vehicle body in the wiring pattern W314.

A wiring pattern W315, which electrically connects the output voltage stabilization circuit 355 and the MOSFET 351, is formed on the bottom surface of the wiring board BD3 and outside a shaded area enclosed by the imaginary line L31 and the wiring pattern W314. More specifically, in the wiring pattern W315, a wiring extends leftward (i.e., in the right-to-left direction) from the output voltage stabilization circuit 355 to the gate of the MOSFET 351.

A wiring pattern W316, which electrically connects the MOSFET 351 and the resistor 352, is formed on the bottom surface of the wiring board BD3 and outside the shaded area enclosed by the imaginary line L31 and the wiring pattern W314. More specifically, the wiring pattern W316 lies forward of and in parallel with the wiring pattern W315, where a wiring extends rightward from the source of the MOSFET 351 to the back-side connection terminal of the resistor 352.

Wiring patterns W317, W318, each of which electrically connects the resistor 352 and the output voltage stabilization circuit 355, are formed on the bottom surface of the wiring board BD3 and outside the shaded area enclosed by the imaginary line L31 and the wiring pattern W314. More specifically, each of the wiring patterns W317, W318 lies forward of and in parallel with the wiring pattern W315. In the wiring pattern W317, a wiring extends rightward from the back-side connection terminal of the resistor 352 to the output voltage stabilization circuit 355. In the wiring pattern W318, a wiring extends rightward from the front-side connection terminal of the resistor 352 to the output voltage stabilization circuit 355.

A wiring pattern W319, which electrically connects the low-voltage battery and a first one of the pair of connection terminals I301 of the primary coil, is formed on the top surface of the wiring board BD3 and outside the shaded area enclosed by the imaginary line L31 and the wiring pattern W314. More specifically, in the wiring pattern W319, a wiring extends leftward from the low-voltage battery and turns left to further extend forward to the first one of the pair of connection terminals I301 of the primary coil.

A wiring pattern W320, which electrically connects the primary coil and the MOSFET 351, is formed on the bottom surface of the wiring board BD3 and outside the shaded area enclosed by the imaginary line L31 and the wiring pattern W314. More specifically, in the wiring pattern W320, a wiring extends forward from a second one (different from the first one) of the pair of connection terminals I301 of the primary coil and turns right to further extend leftward and again turns left to further extend forward to the drain of the MOSFET 351.

It should be noted that a set of the wiring patterns W301 to W305 of the power supply circuit 34 and a set of the wiring patterns W314 to W318 of the power supply circuit 35 are symmetric to each other with respect to an imaginary line L32 (preferably, a straight line) running in the front-back direction. According to the third embodiment, similar effects to the first embodiment are furnished. Specifically to the third embodiment, the output voltage stabilization circuits are mounted on the bottom surface of the wiring board so as to be located opposite to the respectively corresponding transformers, which leads to reduction in horizontal dimension of a mounting region for the motor-generator control apparatus as compared to the first embodiment. This can ensures enough room for other circuits to be mounted on a right side portion of the wiring board.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A power conversion apparatus comprising:
a transformer mounted on a wiring board and including a primary coil, a secondary coil, and a feedback secondary coil;
a switching element mounted on the wiring board and electrically connected to one of a pair of connection terminals of the primary coil, the switching element being operable to convert a DC voltage supplied from a voltage source electrically connected to the other of the pair of connection terminals of the primary coil into an AC voltage to supply the AC voltage to the primary coil by being turned on and off;
a feedback rectification circuit mounted on the wiring board and electrically connected to the feedback secondary coil, the rectification circuit being operable to rectify an AC voltage outputted from the feedback secondary coil into a DC voltage;
a control circuit mounted on the wiring board and electrically connected to the switching element and to the feedback rectification circuit, the control circuit being operable to control the switching element in response to the DC voltage outputted from the feedback rectification circuit;
a first wiring pattern that electrically connects the feedback rectification circuit and the control circuit, the first wiring pattern being formed in one of two surface regions of the wiring board separated from each other by an imaginary line running through a first junction of the first wiring pattern and the feedback rectification circuit and a second junction of the first wiring pattern and the control circuit; and
a second wiring pattern that electrically connects the control circuit and the switching element, the second wiring pattern being formed outside an area enclosed by the imaginary line and the first wiring pattern.

2. The apparatus of claim 1, further comprising a smoothing capacitor mounted on the wiring board and electrically connected to the feedback rectification circuit, the smoothing capacitor being operable to smooth the DC voltage rectified by the feedback rectification circuit,
wherein the smoothing capacitor is electrically connected to the feedback rectification circuit via the first wiring pattern.

3. The apparatus of claim 1, further comprising:
a current detection circuit mounted on the wiring board and electrically connected to the switching element, the current detection circuit being operable to detect a current flowing through the switching element;
a third wiring pattern that electrically connects the switching element and the current detention circuit, the third wiring pattern being formed outside the area enclosed by the imaginary line and the first wiring pattern; and
a fourth wiring pattern that electrically connects the current detection circuit and the control circuit, the fourth wiring pattern being formed outside the area enclosed by the imaginary line and the first wiring pattern,
wherein the control circuit is electrically connected to the current detection circuit and determines whether or not there exists an abnormality on the basis of the current detected by the current detection circuit.

4. The apparatus of claim 3, wherein the third and the fourth wiring patterns are arranged parallel with the second wiring pattern.

5. The apparatus of claim 3, comprising two distinct sets of circuits each including the transformer, the switching element, the feedback rectification circuit, the current detection circuit, and the control circuit,
wherein a first set of the first to fourth wiring patterns for one of the two sets of circuits and a second set of the first to fourth wiring patterns for the other of the two sets of circuits are symmetric to each other with respect to an imaginary line on the wiring board.

6. The apparatus of claim 1, further comprising:
a fifth wiring pattern that electrically connects the voltage source and the primary coil, the fifth wiring pattern being formed outside the area enclosed by the imaginary line and the first wiring pattern; and
a sixth wiring pattern that electrically connects the primary coil and the switching element, the sixth wiring pattern being formed outside the area enclosed by the imaginary line and the first wiring pattern.

7. The apparatus of claim 1, wherein a pair of connection terminals of the feedback secondary coil, the pair of connection terminals of the primary coil, and a pair of connection terminals of the secondary coil are arranged in a row in this order along a direction from one end of the transformer to the other.

8. The apparatus of claim 1, further comprising:
a seventh wiring pattern electrically connected to the pair of connection terminals of the secondary coil and passed under the transformer.

9. The apparatus of claim 1, wherein the apparatus is mounted in a vehicle.

* * * * *